United States Patent
Cho et al.

(10) Patent No.: US 12,009,485 B2
(45) Date of Patent: Jun. 11, 2024

(54) SOLID ELECTROLYTE MEMBRANE INCLUDING CYAN-BASED POLYMER ELECTROLYTE AND BATTERY INCLUDING THE SAME

(71) Applicant: SOELECT INC., Greensboro, NC (US)

(72) Inventors: Sungjin Cho, Summerfield, NC (US); Jongsoo Cho, Greensboro, NC (US)

(73) Assignee: SOELECT INC., Greensboro, NC (US)

(*) Notice: Subject to any disclaimer, the term of this patent is extended or adjusted under 35 U.S.C. 154(b) by 0 days.

(21) Appl. No.: 17/864,605

(22) Filed: Jul. 14, 2022

(65) Prior Publication Data

US 2022/0352562 A1 Nov. 3, 2022

Related U.S. Application Data

(63) Continuation-in-part of application No. PCT/US2021/029511, filed on Apr. 28, 2021.

(60) Provisional application No. 63/019,724, filed on May 4, 2020.

(51) Int. Cl.
*H01M 10/42* (2006.01)
*H01M 10/0525* (2010.01)
*H01M 10/056* (2010.01)
*H01M 50/446* (2021.01)

(52) U.S. Cl.
CPC ... *H01M 10/4235* (2013.01); *H01M 10/0525* (2013.01); *H01M 10/056* (2013.01); *H01M 50/446* (2021.01); *H01M 2300/0068* (2013.01); *H01M 2300/0082* (2013.01); *H01M 2300/0091* (2013.01)

(58) Field of Classification Search
CPC .......... H01M 10/4235; H01M 50/446; H01M 10/0525
USPC .......... 429/251, 254, 309, 339, 314
See application file for complete search history.

(56) References Cited

U.S. PATENT DOCUMENTS

| | | | |
|---|---|---|---|
| 6,290,878 B1 | 9/2001 | Hilaire et al. | |
| 2016/0064770 A1* | 3/2016 | Lee ................ | H01M 10/0565 429/188 |
| 2017/0162911 A1 | 6/2017 | Gaben | |

(Continued)

FOREIGN PATENT DOCUMENTS

| | | | | |
|---|---|---|---|---|
| CN | 105826603 B | | 6/2018 | |
| CN | 108963332 A | * | 12/2018 | ........ H01M 10/0525 |

(Continued)

OTHER PUBLICATIONS

Chen et al., A new composite solid electrolyte PEO/$Li_{10}GeP_2S_{12}$/SN for all-solid-state lithium battery, 2016, Electrochimica Acta, 210, 905-914 (Year: 2016).*

*Primary Examiner* — Sean P Cullen
(74) *Attorney, Agent, or Firm* — Sage Patent Group

(57) ABSTRACT

This disclosure relates generally to solid electrolyte membranes made from the combination of a polymer, a lithium salt group comprising of inorganic and/or organic anion, cyano molecules, a plasticizer having such a high dielectric solvent, and, optionally, a filler having nano/micron size particles to prevent the crystallization of such a polymer matrix. The resultant structures are solid electrolyte membranes exhibiting high ionic conductivity, thermal and electrochemical stability capable of enhanced cycling performance as well as high mechanical strength able to permit improved battery manufacturing properties.

20 Claims, 12 Drawing Sheets

| Sample | Free Standing / Substrate | Composition | Ionic Conductivity (S/cm) |
|---|---|---|---|
| 1 | Free Standing SEM | PAN/ $LiPF_6$/ 1,3-Dicyanopropane/Butyl cyanide | 1.3 x E(-3) |
| 2 | | Free Standing PAN / $LiAsF_6$ / 1,3-Dicyanopropane/Butyl cyanide | 1.2 x E(-3) |
| 3 | | PAN-PEO / $LiPF_6$ / 1,3-Dicyanopropane/Butyl cyanide | 6.0 x E(-4) |
| 4 | SEM with Substrate (Porous cellulose membrane) | PAN/ LiTFSI / 1,3-Dicyanopropane | 6.7 x E(-4) |
| 5 | | PAN/ LiTFSI(60) -$LiPF_6$(40)/ 1,3-Dicyanopropane/Butyl cyanide | 1.0 x E(-3) |
| 6 | | PAN/ LiTFSI/ Butyl cyanide | 1.2 x E(-4) |
| 7 | | PAN/ LiTFSI(60)-$LiPF_6$(40) | 6.2 x E(-4) |
| 8 | | PAN/ LiTFSI(60)-$LiPF_6$(40) / 1,4-Dicyanobutane/Butyl cyanide | 5.7 x E(-4) |
| 9 | | PAN/ LiTFSI(60)-$LiAsF_6$(40) / 2-Methylglutaronitrile | 1.1 x E(-3) |
| 10 | | PAN / LiTFSI(60)-$LiAsF_6$(40) / 1,4-Dicyanobutane | 1.3 x E(-3) |
| 11 | | PAN-PEO / $LiPF_6$/ 1,3-Dicyanopropane/Butyl cyanide | 5.7 x E(-4) |
| 12 | | PAN-PEO / $LiAsF_6$ / 1,3-Dicyanopropane/Butyl cyanide | 4.6 x E(-4) |

(56) References Cited

U.S. PATENT DOCUMENTS

2020/0335814 A1* 10/2020 Lin .................... H01M 10/052
2021/0083317 A1* 3/2021 Yang ................ H01M 10/0525

FOREIGN PATENT DOCUMENTS

| CN | 109037766 A | * | 12/2018 |
| CN | 111740156 A | * | 10/2020 |
| CN | 111740157 A | * | 10/2020 |

* cited by examiner

| Sample | Free Standing / Substrate | Composition | Ionic Conductivity (S/cm) |
|---|---|---|---|
| 1 | Free Standing SEM | PAN/ LiPF$_6$ / 1,3-Dicyanopropane/Butyl cyanide | 1.3 x E(-3) |
| 2 | | Free Standing PAN / LiAsF$_6$ / 1,3-Dicyanopropane/Butyl cyanide | 1.2 x E(-3) |
| 3 | | PAN-PEO / LiPF$_6$ / 1,3-Dicyanopropane/Butyl cyanide | 6.0 x E(-4) |
| 4 | SEM with Substrate (Porous cellulose membrane) | PAN/ LiTFSI / 1,3-Dicyanopropane | 6.7 x E(-4) |
| 5 | | PAN/ LiTFSI(60) -LiPF$_6$(40)/ 1,3-Dicyanopropane/Butyl cyanide | 1.0 x E(-3) |
| 6 | | PAN/ LiTFSI/ Butyl cyanide | 1.2 x E(-4) |
| 7 | | PAN/ LiTFSI(60)-LiPF$_6$(40) | 6.2 X E(-4) |
| 8 | | PAN/ LiTFSI(60)-LiPF$_6$(40) / 1,4-Dicyanobutane/Butyl cyanide | 5.7 x E(-4) |
| 9 | | PAN/ LiTFSI(60)-LiAsF$_6$(40) / 2-Methylglutaronitrile | 1.1 x E(-3) |
| 10 | | PAN / LiTFSI(60)-LiAsF$_6$( 40) / 1,4-Dicyanobutane | 1.3 x E(-3) |
| 11 | | PAN-PEO / LiPF$_6$ / 1,3-Dicyanopropane/Butyl cyanide | 5.7 x E(-4) |
| 12 | | PAN-PEO / LiAsF$_6$ / 1,3-Dicyanopropane/Butyl cyanide | 4.6 x E(-4) |

Fig. 23

| Sample No. | Composition | Tensile Stress(MPa) |
|---|---|---|
| 1 | [Free-Standing] PAN-PEO/LiPF6 /1,3-Dicyanopropane/Butyl cyanide | 0.5 |
| 2 | [Substrate] PAN-PEO/LiPF6 /1,3-Dicyanopropane/Butyl cyanide | 7.8 |

Fig. 24

SOLID ELECTROLYTE MEMBRANE INCLUDING CYAN-BASED POLYMER ELECTROLYTE AND BATTERY INCLUDING THE SAME

CROSS-REFERENCE TO RELATED APPLICATIONS

This application is a continuation-in-part of PCT/US2021/29511, filed on Apr. 28, 2021, which claims priority to U.S. Provisional Patent Application No. 63/019,724, filed on May 4, 2020. The entireties of the Patent Cooperation Treaty application and the provisional application are incorporated herein by reference.

BACKGROUND OF THE PRIOR ART

Solid-state batteries have garnered significant attention due to certain attractive performance characteristics, including long shelf life, long-term stable power capability, broad operating temperature ranges, and high volumetric energy density. Such batteries are particularly suited for applications requiring long life under low-drain or open-circuit conditions.

Currently, lithium ion batteries, particularly those including liquid electrolytes, are widely used and impart the best performance in this commercial area. Such liquid electrolyte systems require certain components that allow for immersion in the liquid electrolyte, allowing for very high conductivity for the transport of lithium ions between the cathode and anode during charge and discharge. These types of batteries include porous structures, particularly a separator, composite cathode, and anode, to allow for liquid electrolyte absorption as it fills the battery chamber. This, in turn, allows for surface contact with the lithium active materials and transport of lithium ions throughout the cell with minimal impedance.

The liquid electrolyte itself consists of a Li salt (for example, $LiPF_6$) in a solvent blend which typically includes ethylene carbonate and other linear carbonates, such as dimethyl carbonate. Despite improvements in energy density and cycle life, there remain several underlying problems with batteries that contain liquid electrolytes. For example, liquid electrolytes are generally volatile and subject to pressure build up, explosion, and fire under a high charge rate, a high discharge rate, and/or internal short circuit conditions. Additionally, charging at a high rate can cause dendritic lithium growth on the surface of the anode. The resulting dendrites can extend through the separator and internally short circuit in the cell. Further, the self-discharge and efficiency of the cell is limited by side reactions and corrosion of the cathode by the liquid electrolyte. Still further, the liquid electrolyte also creates a hazard if the cell over-heats due to overvoltage or short circuit conditions, creating another potential fire or explosion hazard.

To address safety and reliability problems with lithium based batteries that employ liquid electrolytes, and to achieve high energy density, solid-state batteries that employ high capacity lithium intercalation compounds are being developed. To accomplish such a result, however, there are needed solid-state batteries including solid-state electrolyte films that exhibit sufficient and effective charge capabilities with concomitant safety levels.

In that manner, then, in order for rechargeable batteries to be applied not only to electric vehicles, but also to special industries such as aviation, space, defense, and medicine, it is necessary to secure a much higher level of reliability and stability. When a solid-state electrolyte is utilized, such a structural component may solve safety issues such as leakage of and explosion due to liquid electrolytes. Additionally, energy density can be increased due to the simplification of existing battery safety components, as well. However, such a solid electrolyte generally exhibits lower battery power properties due to lower ionic conductivity (as compared with liquid electrolytes) and further exhibits a noticeable higher resistance at the interface between such a solid electrolyte and positive and negative electrodes. The operating principle of all-solid-state batteries and existing lithium secondary batteries is the same fundamentally, but the risk of fire and explosion due to temperature changes and external shocks is reduced by replacing a liquid electrolyte with one that is completely solid. Various solid electrolytes have been developed and utilized in the past, including sulfide-based and oxide-based conductive polymers with performance levels that need improvement, particularly in terms of increased ionic conductivity and lower interface resistance between the positive and negative electrodes and such prior solid electrolyte materials.

Sulfide-based electrolytes exhibit advantages such as high ion conductivity (up to $10^{-2}$ S/cm) and thermal stability, but they are vulnerable to humidity and may generate undesirable gases such as hydrogen sulfide. Additionally, such sulfide-based materials exhibit technical issues regarding interface resistance as well as narrow electrochemical window properties. Oxide-based electrolytes exhibit excellent strength and high electrochemical stability, but such solid materials also exhibit low ionic conductivity and high interface resistance with electrodes. As well, such oxide-based solid electrolytes exhibit low producibility due to necessarily high-temperature heat treatment processes to provide effective calcination and sintering.

Solid polymer electrolytes (SPE) are attractive, certainly, within such solid-state battery technologies, in part due to advantageous processibility, effective electrode contact properties, cost effectiveness, and design flexibility due to the elimination of polymer separators, even if such solid materials exhibit certain deficiencies as noted above, such as low ionic conductivity, low thermal stability, and low mechanical strength. Polyethylene oxide (PEO) has been used as the most common solid polymer electrolyte, but its application is limited, again, due to its low ionic conductivity and narrow electrochemical window (<3.9V). Another promising polymer, polyacrylonitrile (PAN) has been investigated for advantages such as its wide electrochemical stable window and good chemical compatibility with lithium anodes. However, PAN exhibits low thermal stability and mechanical strength characteristics which limit its effectiveness (and enhancements in these areas are still sought after). Meanwhile, cyano molecules such as mono and dicyano molecules are known as rotating molecules showing plastic behaviors retaining short to long-range molecular orders. These properties make cyano molecules highly ionically conductive due to transfer processes through a "revolving door mechanism". Furthermore, this molecule has been reported as exhibiting effective thermal and electrochemically stability for battery incorporation and utilization. However, such cyano molecules have yet to be introduced within the solid electrolyte membrane industry, particularly in relation to dry polymer electrolyte film materials.

There thus remains a significant need for improved solid polymeric electrolytes for solid-state battery utilization.

SUMMARY OF THE DISCLOSURE

The present disclosure thus relates to solid electrolyte membranes having excellent ionic conductivity, high mechanical tensile strength, and electrochemical stability. To that end, it was determined that the ionic conductivity and the cycling performance of a solid electrolyte may be improved through the combination of a cyano molecule with a specific lithium salt(s), a polymer, and a plasticizer.

Disclosed herein is a solid electrolyte membrane having high ionic conductivity and thermal and electrochemical stability capable of enhanced cycling performance as well as high mechanical strength permitting improved manufacturing processability.

In some embodiments, such a unique solid electrolyte membrane comprises a reactive combination of constituents as follows:

a) at least one polymer or co-polymer selected from the group of polyacrylonitrile, polyethylene oxide, polyepoxides (epoxy resin), polymethyl methacrylate, poly(styrene-co-acrylonitrile), poly(acrylonitrile-co-butadiene-co-styrene), acrylonitrile butadiene rubber (NBR), and any combination thereof;

b) at least one lithium salt having i) an inorganic anion selected from the group of lithium perchlorate (LiClO$_4$), lithium tetrafluoroborate (LiBF$_4$), lithium hexafluorophosphate (LiPF$_6$), lithium hexafluoro-arsenate (LiAsF$_6$), lithium hexafluoroantimonate (LiSbF$_6$), lithium hexafluorotanralate (LiTaF$_6$), lithium hexafluoroniobate (LiNbF$_6$), ii) an organic anion selected from the group of lithium trifluoromethanesulfonate (LiCF$_3$SO$_3$), lithium perfluorobutylsulfonate (LiC$_4$F$_9$SO$_3$), lithium bis(trifluoromethanesulfonyl)imide (LiC$_2$F$_6$NO$_4$S$_2$, LiTFSI), lithium bis (perfluoroethane-sulfonyl)imide (Li(CF$_3$CF$_2$SO$_2$)$_2$N, LiBETI), lithium tris(trifluoromethanesulfonyl) methide (C$_4$F$_9$LiO$_6$S$_3$), lithium pentafluoroethyltrifluoroborate (LiBF$_3$(C$_2$F$_5$)), lithium bis(oxalato)borate (LiB(C$_2$O$_4$)$_2$), lithium tetra(pentafluorophenyl)borate (C$_{24}$BF$_{20}$Li), lithium fluoroalkylphosphate (LiPF$_3$(CF$_3$CF$_2$)$_3$), lithium difluorophosphate, lithium(difluorooxalato)borate, and iii) any combination of i) and ii);

c) at least one cyano-based molecule comprising i) a mono cyano molecule selected from the group of butyl cyanide, 2-methylglutaronitrile, α-methyl-valerodinitrile, and percyanoethylene, ii) a dicyano molecule selected from the group of 1,4-Dicyanobutane, 1,3-dicyanopropane, 1,4-dicyanobutane, 1,2-dicyanoethane, 1,3-dicyanopropane, 1,5-dicyanopetane, 1,6-dicyanohexane, trans-1,4-dicyano-2-butene, and trans-1,2-dicyanoethylene, iii) tetracyanoethylene, iv) 2,5-cyclohexadiene-1,4-diylidene and any cyano-derivatives thereof, or v) any combination of i), ii), iii), and iv);

d) at least one plasticizer present within at least one high dielectric solvent selected from the group of γ-butyrolactone (GBL), dimethyl sulfoxide (DMSO), N-methyl-2-pyrrolidone (NMP), dimethylformamide (DMF), acetonitrile (AN), propylene carbonate (PC), 1,3-dioxolan-2-one, and any combination thereof; and e) at least one nano- and/or micron-sized particle filler selected from the group of oxide, carbide, nitride, halide based inorganic materials [such as LiAl(SiO$_3$)$_2$, LiAlSi$_4$O$_{10}$, LiNO$_3$, NaNO$_3$, CsNO$_3$, RbNO$_3$, KNO$_3$, AgNO$_3$, NH$_4$NO$_3$, Ba(NO$_3$)$_2$, Sr(NO$_3$)$_2$, Mg(NO$_3$)$_2$, Ca(NO$_3$)$_2$, Ni(NO$_3$)$_2$, Co(NO$_3$)$_2$, Mn(NO$_3$)$_2$, Al(NO$_3$)$_3$, Ce(NO$_3$)$_3$, Li$_{1.3}$Al$_{0.3}$Ti$_{1.7}$(PO$_4$)$_3$, Li$_{1.5}$Al$_{0.5}$Ge$_{1.5}$(PO$_4$)$_3$, Li$_7$La$_3$Zr$_2$O$_2$, Li$_{0.33}$La$_{0.557}$TiO$_3$, Li$_2$O—SiO$_2$—TiO$_2$—P$_2$O$_5$, Al$_2$O$_3$, SiO$_2$, TiO$_2$, BaTiO$_3$, Ta$_2$O$_5$, ZrO$_2$, Si$_3$N$_4$, SiC, PbTiO$_3$, LiNbO$_3$, AlN (aluminum nitride), Y$_2$O$_3$, HfO$_2$, Li$_2$O, Li$_3$PO$_4$, LiF, LiCl, Li$_2$S—P$_2$S$_5$, and argyrodite compounds including Li$_2$S—P$_2$S$_5$—LiCl], lithophilic inorganic compounds including cations such as Al, Ag, Au, Zn, Mg, Si, Sn, Ge, In, Ba, Bi, B, Ca, Cd, Ir, Pd, Pt, Rh, Sb, Se, Sr, Te, Zn, AgO, MgO, MnO$_2$, Co$_3$O$_4$, SnO$_2$, SiO$_2$, SiOx, (0.5<x<1.5), ZnO, CuO, Cu$_2$O, and an hybrid material including either one from metal or non-metal clay.

The present disclosure thus provides a solid electrolyte membrane that overcomes the previous deficiencies associated with low ionic strength, high interface resistance, and low strength. Such a solid electrolyte membrane may be introduced within solid-state batteries and interfaced with anodes including carbonaceous materials such as graphite(s), hard carbon, soft carbon, carbon nanotube, silicon-graphite (or/and carbon composite) and lithium titanate (Li$_4$Ti$_5$O$_{12}$); lithium metal or any negative substrates in anode free cell configuration; or cathode(s) included any lithium metal oxides such as LiNiCoMnO$_2$(NMC), LiNiCoAlO$_2$(NCA), LiCoO$_2$(LCO) LiMn$_2$O$_4$(LMO), LiFePO$_4$ (LFP) or separator as substrate including polyolefins, such as polyethylene, polypropylene, blends and/or combinations thereof, cellulose-based, lignin-based materials, and ceramic-filled separators using direct solution casting.

The present disclosure further relates to and encompasses electrochemical devices, such as, without limitation, lithium ion batteries and like energy storage articles, that include and utilize the solid electrolyte membranes described herein.

BRIEF DESCRIPTION OF THE DRAWINGS

To obtain a better understanding of the features and advantages of the disclosed subject, a reference to the following description on illustrative embodiments, which the principles of the disclosed subject are utilized, and the accompanying drawings of which:

FIG. 23 shows a data table of ionic conductivity values for various chemical composition embodiments of disclosed solid electrolyte membranes;

FIG. 24 is a data table of tensile stress values for free-standing (FS) and solid electrolyte membrane (SEM) coated on substrate (porous cellulose membrane); and

DETAILED DESCRIPTION OF THE DRAWINGS AND PREFERRED EMBODIMENTS

All the features of this disclosure and its preferred embodiments will be described in detail in connection with the following illustrative, but non-limiting, drawings and examples. Thus, the drawings provided herein are not intended to limit the scope and breadth of the disclosed materials and devices but serve to provide a few different embodiments thereof.

Example 1. Synthesis of Solid Electrolyte Membrane, [Free Standing] PAN/LiPF$_6$ or LiAsF$_6$ or LiTFSI/1,3-dicyanopropane or 2-methylglutaronitrile or butyl The following materials were used for synthesis of the solid electrolyte solution: polyacrylonitrile (PAN, MW 150,000, Sigma Aldrich), 1,3-dioxolan-2-one, spodumene (LiAl(SiO$_3$)$_2$) powders, lithium hexafluorophosphate (LiPF$_6$, 97%+, TCI America), lithium hexafluoroarsenate (LiAsF$_6$, 99%, Alfa Aesar), and lithium bis(trifluoromethanesulfonyl) imide (LiTFSI, 98%, TCI America), 1,3-dicyanopropane, and 2-methylglutaronitrile (2-methylglutaronitrile, 99%, Sigma Aldrich)

In a glove box, a solution was prepared by first melting 1,3-dioxolan-2-one at 70° C. and then adding PAN at 9~12% of 1,3-dioxolan-2-one by mass. For complete dissolution, the mixture was stirred with a magnetic stirrer at 70° C. for 2 hours. When PAN fully dissolved, a lithium salt (LiPF$_6$ or LiAsF$_6$ or LiTFSI each) of 0.8M was added to this solution and was dissolved over 1 hour of stirring under the same conditions. An addition of 1,3-dicyanopropane or 2-methylglutaronitrile was made at an amount of 20% of total solution by mass and the solution was stirred for another 1 hour. Finally, the filler, spodumene (LiAl(SiO$_3$)$_2$) powder, was added at an amount of 3% of total solution by mass and stirred for an additional 1 hour. The completed solution was cast onto a clean sheet of aluminum foil adhered to a glass plate by drawing down the material with a doctor blade. The membrane casting was dried under vacuum conditions at room temperature for 2 hours.

Coin cells 2032 were assembled using solid electrolyte membrane prepared as described above with cathode electrode (NCA, NMC811) and anode electrode (lithium metal). Each coin cell was cycled at 0.1C for $1^{st}$ cycle, 0.2C for $2^{rd}$ cycle and 0.3C from $3^{rd}$ cycle to the end of cycling test using a voltage window of 3.0V to 4.3V.

Figure 1:
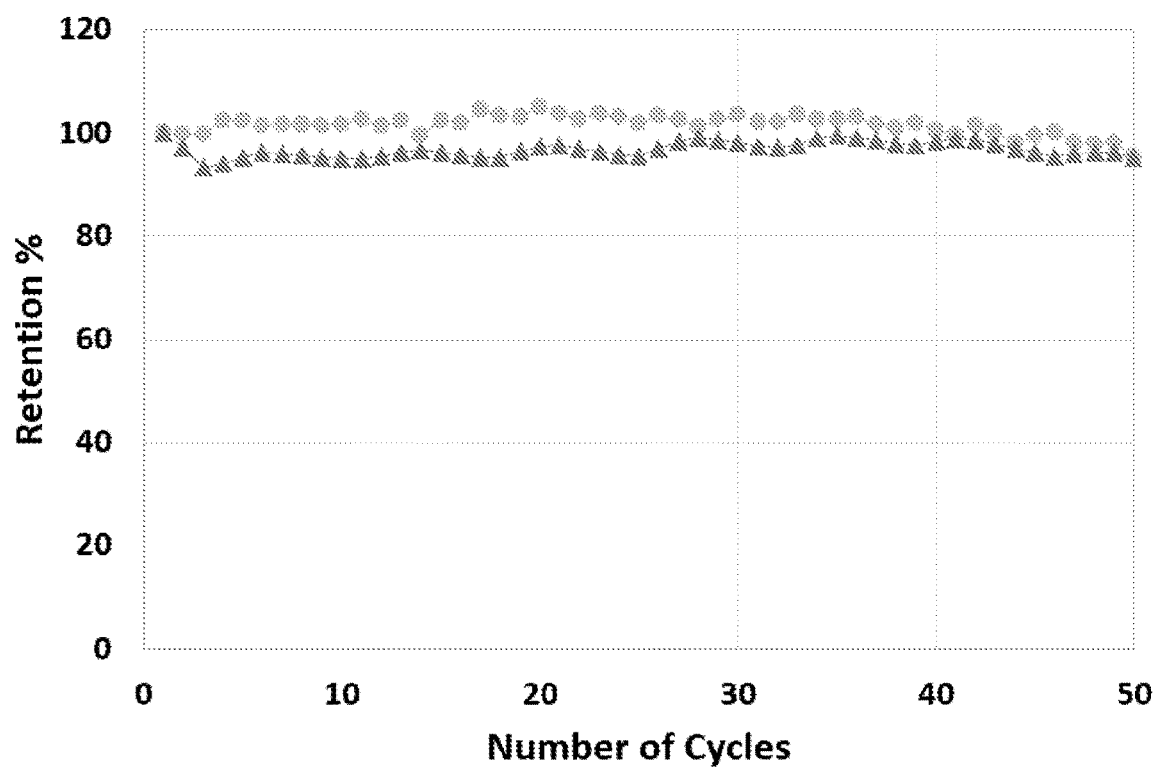
FIG. 1 shows a graphical representation of the cycling performance of one disclosed embodiment solid electrolyte with a capacity retention at 0.5C.

FIG. 1 shows the cycling performance of the Example 1 solid electrolyte membrane with a capacity retention (%) at 0.5C cycling. Both cells were prepared using NCA as the cathode, solid electrolyte membrane comprising of Free-Standing/PAN/LiPF$_6$/1,3-dicyanopropane/butyl cyanide, and lithium metal of 200 µm thickness as the anode. The cells were cycled at 0.5C and demonstrated retention of 96% even after 50 cycles.

Figure 2:
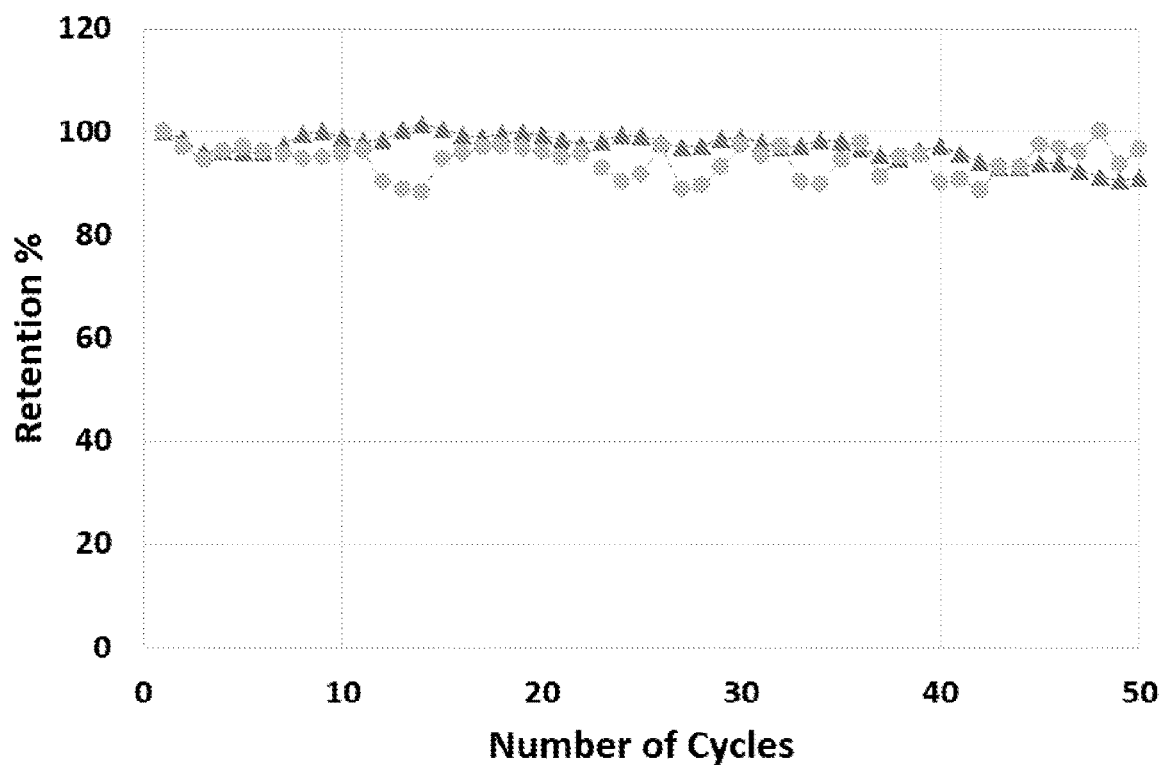
FIG. 2 shows a graphical representation of the cycling performance of another disclosed solid electrolyte embodiment with a capacity retention at 0.5C.

FIG. 2 shows cycling performance with a capacity retention (%) at 0.5C cycling. The two cells were prepared using NCA as the cathode, solid electrolyte membrane comprising Free-Standing/PAN/LiAsF$_6$/1,3-dicyanopropane/butyl cyanide, and lithium metal of 200 µm thickness as the anode. These cells demonstrated retention of 95%, 93% each even after 50 cycles.

Figure 3:
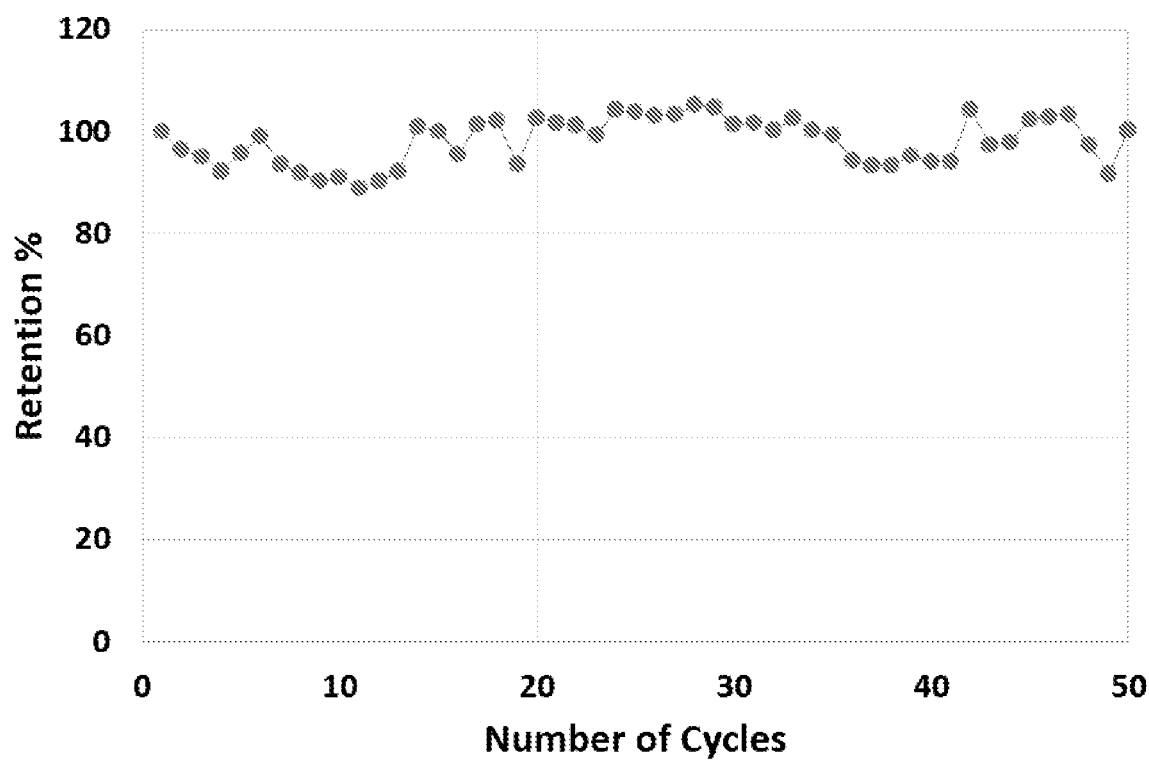
FIG. 3 shows a graphical representation of the cycling performance of another disclosed solid electrolyte embodiment with a capacity retention at 0.5C.

FIG. 3 shows cycling performance with a capacity retention at 0.5C cycling. The cell was prepared using NCA as the cathode, solid electrolyte membrane comprising of Free-Standing/PAN/LiTFSI/1,3-dicyanopropane/butyl cyanide, and lithium metal of 200 µm thickness as the anode. The cell demonstrated retention of 100% after 50 cycles.

Figure 4:
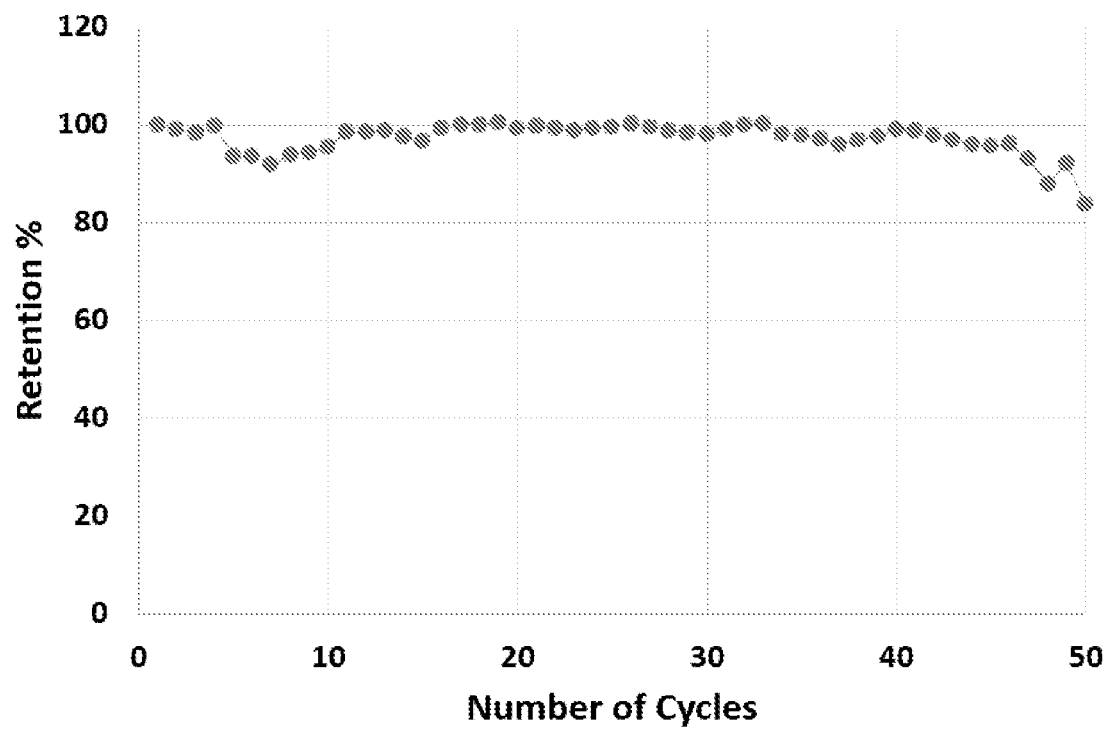
FIG. 4 shows a graphical representation of the cycling performance of another disclosed solid electrolyte embodiment with a capacity retention at 0.5C.

FIG. 4 shows cycling performance with a capacity retention for 50 cycles at 0.5C cycling. The cell was prepared using NCA as the cathode, solid electrolyte membrane comprising of Free-Standing/PAN/LiPF$_6$/2-methylglutaronitrile, and lithium metal of 200 µm thickness as the anode. The cells demonstrated retention of 85% after 50 cycles.

Example 2. Synthesis of Solid Electrolyte Membrane, [Free Standing] PAN-PEO/LiPF$_6$ or LiAsF$_6$/1,3-Dicyanopropane or Butyl Cyanide The following materials were used for synthesis of the solid electrolyte solution: 1,3-dicyanopropane, polyacrylonitrile (PAN, MW 150,000, Sigma Aldrich), polyethylene oxide (PEO, Alfa Aesar) 1,3-dioxolan-2-one, spodumene (LiAl(SiO$_3$)$_2$) powder, lithium hexafluorophosphate (LiPF$_6$, 97%+, TCI America), and lithium hexafluoroarsenate (LiAsF$_6$, 99%, Alfa Aesar).

In a glove box, a solution was prepared by first melting 1,3-dioxolan-2-one at 70° C. and then adding PAN at 9~12% of 1,3-dioxolan-2-one by mass. For complete dissolution, the mixture was stirred with a magnetic stirrer at 70° C. for 2 hours. When PAN fully dissolved, PEO was added at 30% of PAN by mass and stirring was continued for an hour. A lithium salt ($LiPF_6$ or $LiAsF_6$) of 0.8M concentration in an amount matching was added to this solution and was dissolved over 1 hour of stirring under the same conditions. An addition of 1,3-dicyanopropane was made at an amount of 20% of total solution by mass and the solution was stirred for another 1 hour. Finally, the filler, spodumene ($LiAl(SiO_3)_2$) powder, was added at an amount of 3% of total solution by mass and stirred for an additional 1 hour. The completed solution was cast onto a clean sheet of aluminum foil adhered to a glass plate by drawing down the material with a doctor blade. The membrane casting was dried under vacuum conditions at room temperature for 2 hours to create a dried solid electrolyte.

Coin cells 2032 were assembled using solid electrolyte membrane prepared from described above with cathode electrode such as NCA, NMC811 and anode electrode such as lithium metal.

Each coin cell was cycled at 0.1C for $1^{st}$ cycle, 0.2C for $2^{nd}$ cycle and 0.3C from $3^{rd}$ cycle to the end of cycling test using voltage window of 3.0V to 4.3V.

Figure 5:
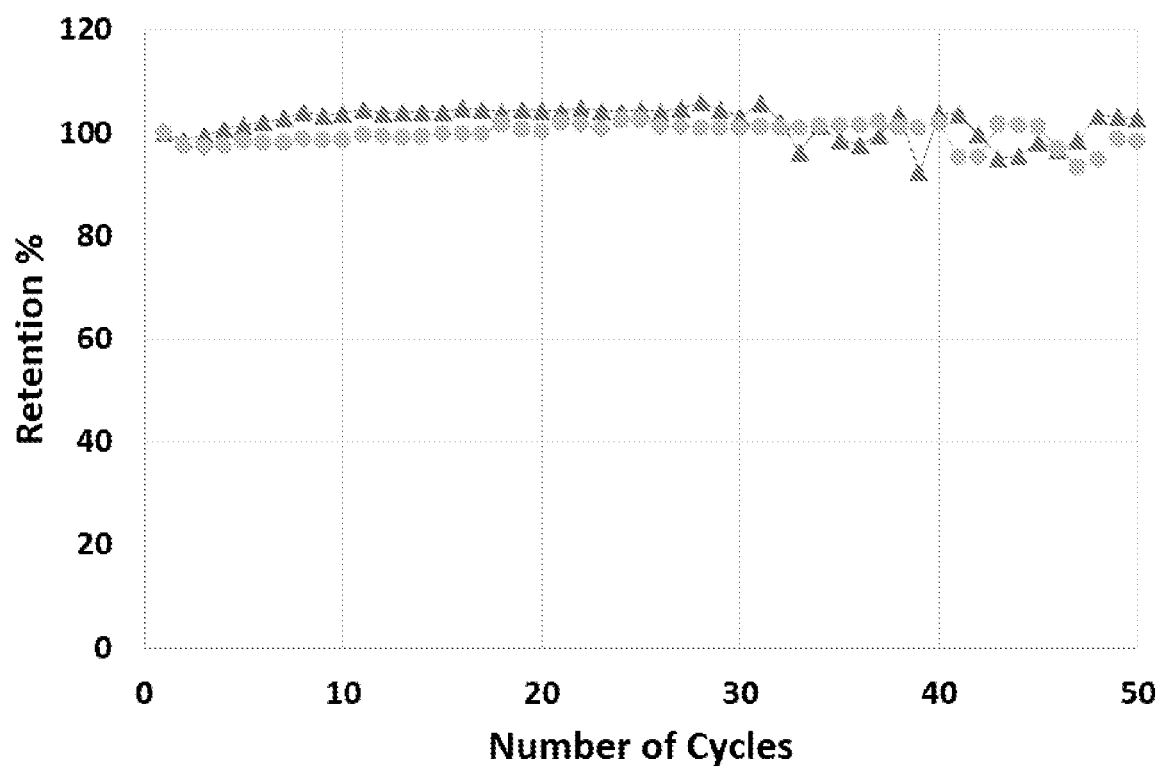
FIG. 5 shows a graphical representation of the cycling performance of another disclosed solid electrolyte embodiment with a capacity retention at 0.3C.

FIG. 5 shows cycling performance with a capacity retention for 50 cycles at 0.3C cycling. Two coin cells were prepared using $LiNi_{0.8}Co_{0.1}Mn_{0.1}O_2$ (NMC811) as the cathode, solid electrolyte membrane comprising of Free-Standing/PAN-PEO/$LiPF_6$/1,3-dicyanopropane, and lithium metal of 200 μm thickness as the anode. The cells demonstrated retention of 103%, 98% each even after 50 cycles.

Figure 6:
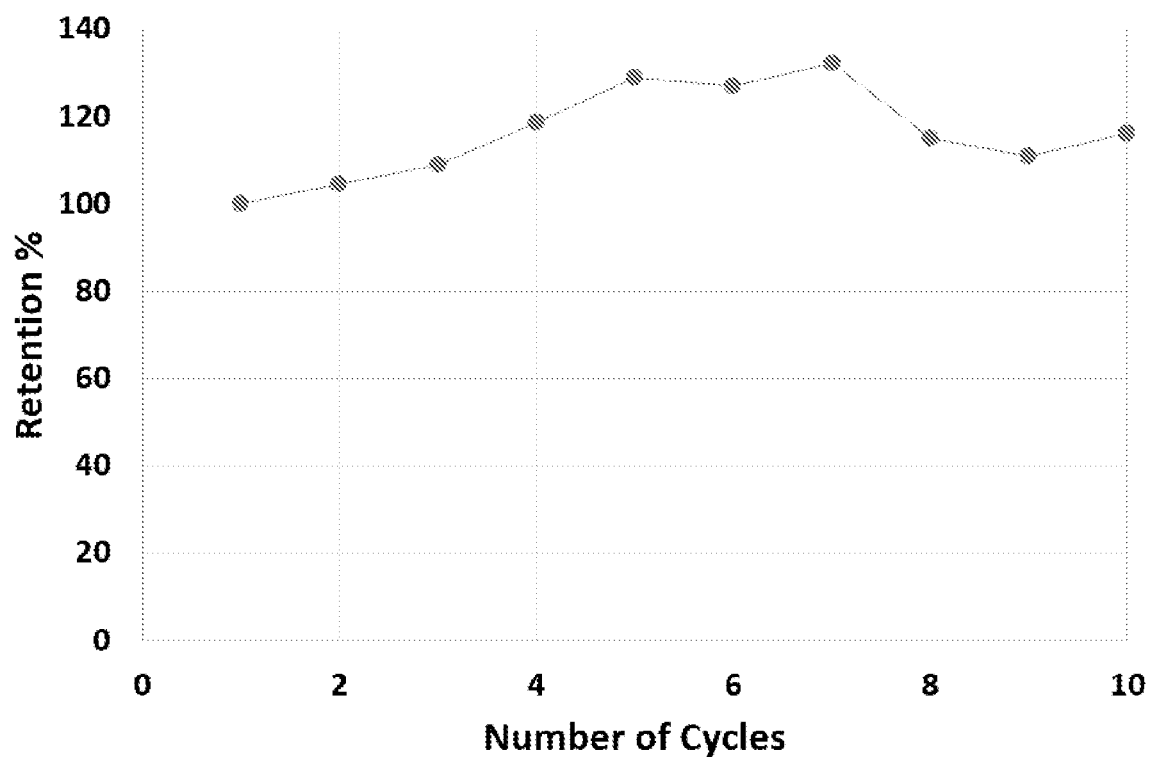
FIG. 6 shows a graphical representation of the cycling performance of another disclosed solid electrolyte embodiment with a capacity retention at 0.3C.

FIG. 6 shows cycling performance with a capacity retention for 10 cycles at 0.3C cycling. The cell was prepared using NMC811 as the cathode, solid electrolyte membrane comprising of Free-Standing/PAN-PEO/$LiAsF_6$/1,3-dicyanopropane, and lithium metal of 200 μm thickness as the anode. The cell demonstrated retention of 117% after 10 cycles.

Example 3. SEM Coating on a Highly Porous Cellulose Membrane (PCM), PAN/$LiPF_6$ or $LiAsF_6$ or LiTFSI or $LiPF_6$—LiTFSI/Butyl Cyanide or 1,4-Dicyanobutane or 2-Methylglutaronitrile or Butyl Cyanide The following materials were used for synthesis of the solid electrolyte solution: polyacrylonitrile (PAN, MW 150,000, Sigma Aldrich), 1,3-dioxolan-2-one, spodumene ($LiAl(SiO_3)_2$) powder, lithium hexafluorophosphate ($LiPF_6$, 97%+, TCI America), lithium hexafluoroarsenate ($LiAsF_6$, 99%, Alfa Aesar), and lithium bis(trifluoromethanesulfonyl) imide (LiTFSI, 98%, TCI America), 1,3-dicyanopropane, butyl cyanide (BUTYL CYANIDE, 99.5%, Sigma Aldrich), 1,4-dicyanobutane (99%, Sigma Aldrich), and 2-methylglutaronitrile (2-methylglutaronitrile, 99%, Sigma Aldrich)

In a glove box, a solution was prepared by first melting 1,3-dioxolan-2-one at 70° C. and then adding PAN at 9~12% of 1,3-dioxolan-2-one by mass. For complete dissolution, the mixture was stirred with a magnetic stirrer at 70° C. for 2 hours. When PAN was fully dissolved, a lithium salt ($LiPF_6$ or $LiAsF_6$ or LiTFSI or 60% LiTFSI-40% $LiPF_6$ each) of 0.8M concentration in an amount matching was added to this solution and was dissolved over 1 hour of stirring under the same conditions. Butyl cyanide (1%) or 1,4-dicyanobutane (20%) or 2-methylglutaronitrile (20%) each were then added in an amount of 0.1~20% of total solution by mass and the solution was stirred for another 1 hour. The completed solution was cast onto a porous cellulose membrane by flattening the sheet on a glass plate and drawing down the material with a doctor blade. The membrane casting was dried under vacuum conditions at room temperature for 2 hours.

Coin cells 2032 were assembled using solid electrolyte membrane prepared from described above with cathode electrode such as NCA, NMC811 and anode electrode such as lithium metal.

Each coin cell was cycled at 0.1C for $1^{st}$ cycle, 0.2C for $2^{nd}$ cycle and 0.3C from $3^{rd}$ cycle to the end of cycling test using voltage window of 3.0V to 4.3V.

Figure 7:
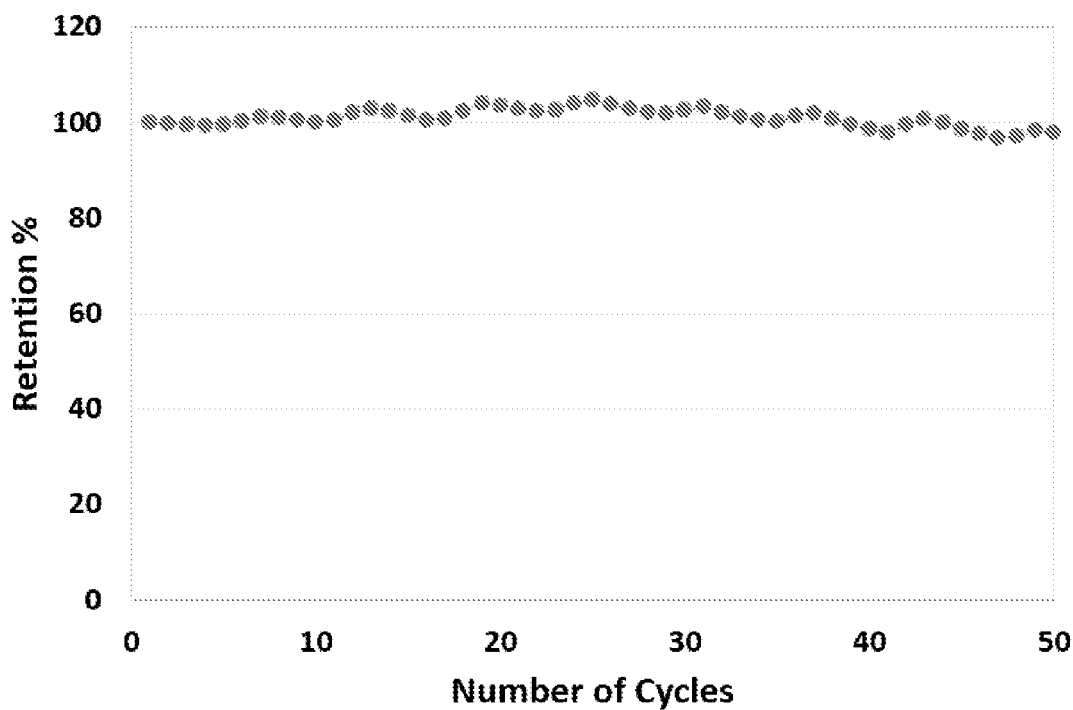
FIG. 7 shows a graphical representation of the cycling performance of another disclosed solid electrolyte embodiment with a capacity retention at 0.3C.

FIG. 7 shows cycling performance with a capacity retention (%) for 50 cycles at 0.3C cycling. The cell was prepared using NMC811 as the cathode, solid electrolyte membrane comprising of porous cellulose membrane (PCM)/PAN-PEO/$LiPF_6$/1,3-dicyanopropane (coating on porous cellulose membrane), and lithium metal of 200 μm thickness as the anode. The cell demonstrated retention of 97% after 50 cycles.

Figure 8:
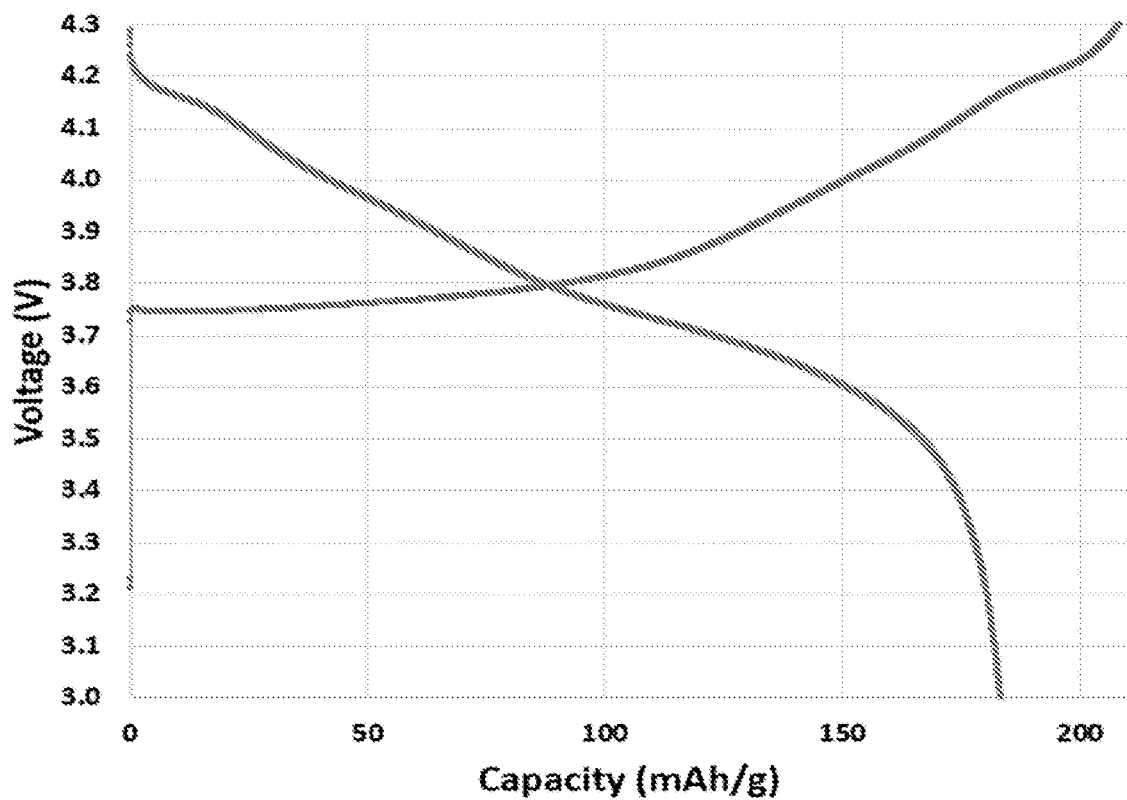
FIG. 8 shows a voltage profile in relation to a solid state electrolyte embodiment disclosed herein for a 1$^{st}$ cycling at 0.1C.

FIG. 8 shows a voltage profile for $1^{st}$ cycling at 0.1C. This cell was charged and discharged at 0.1C for one cycle. The cell was prepared using NMC811 as the cathode, solid electrolyte membrane comprising of PCM/PAN/$LiAsF_6$/1,3-dicyanopropane, and lithium metal of 200 μm thickness as the anode. The obtained charge capacity, discharge capacity and efficiency were 208 mAh/g, 183 mAh/g, 88.0% each.

Figure 9:
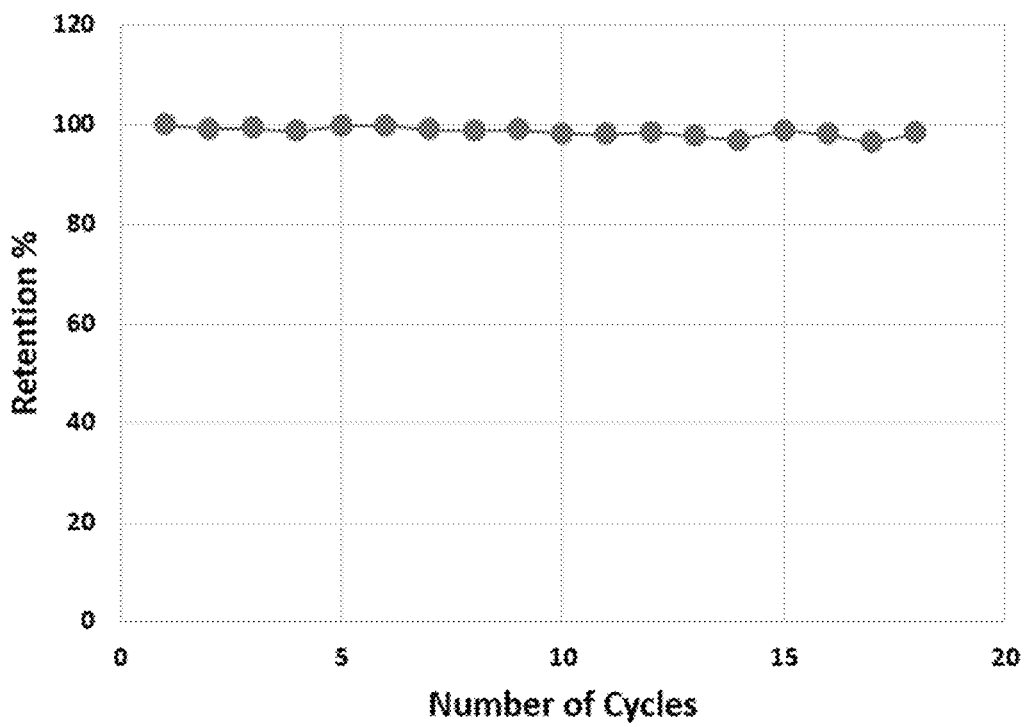
FIG. 9 shows a graphical representation of the cycling performance of another disclosed solid electrolyte embodiment with a capacity retention at 0.3C.

FIG. 9 shows cycling performance with the capacity retention for 18 cycles at 0.3C cycling. The cell was prepared using NMC811 as the cathode, solid electrolyte membrane comprising PCM/PAN/LiTFSI/1,3-dicyanopropane/butyl cyanide, and lithium metal of 200 μm thickness as the anode. The cell demonstrated retention of 98.4% after 18 cycles.

Figure 10:
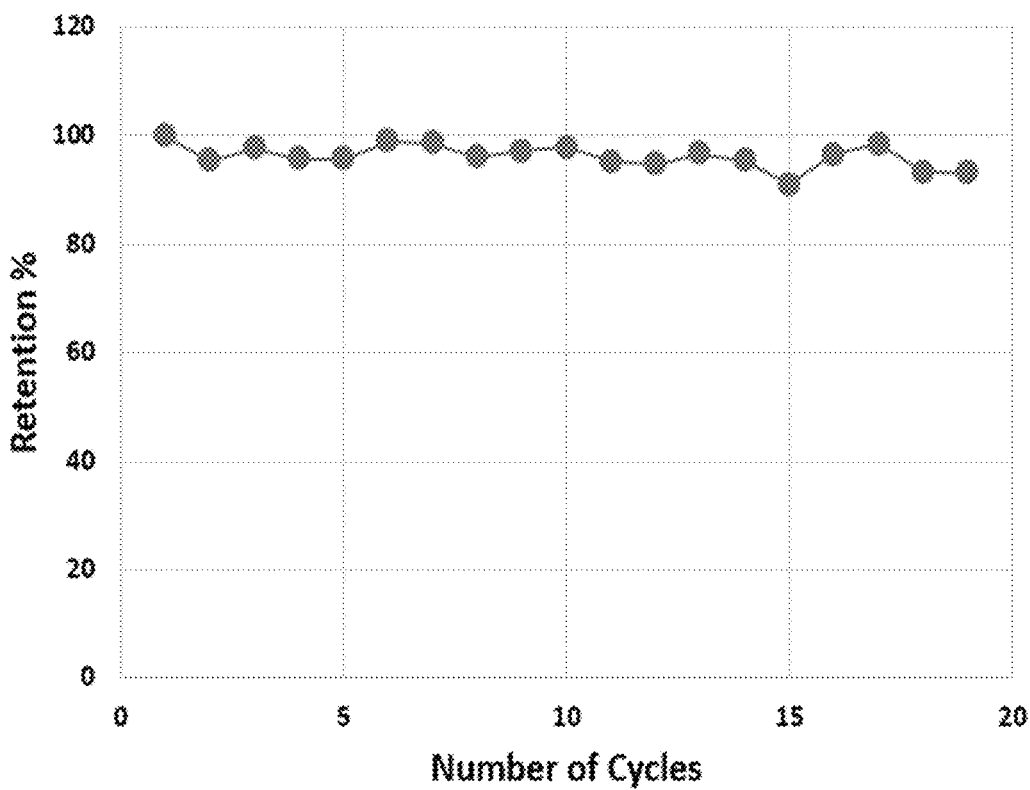
FIG. 10 shows a graphical representation of the cycling performance of another disclosed solid electrolyte embodiment with a capacity retention at 0.3C.

FIG. 10 shows cycling performance with the capacity retention for 19 cycles at 0.3C cycling. The cell was prepared using NMC811 as the cathode, solid electrolyte membrane comprising PCM/PAN/LiTFSI—$LiPF_6$/1,3-dicyanopropane, and lithium metal of 200 μm thickness as the anode. The cell demonstrated retention of 93.3% after 19 cycles.

Figure 11:
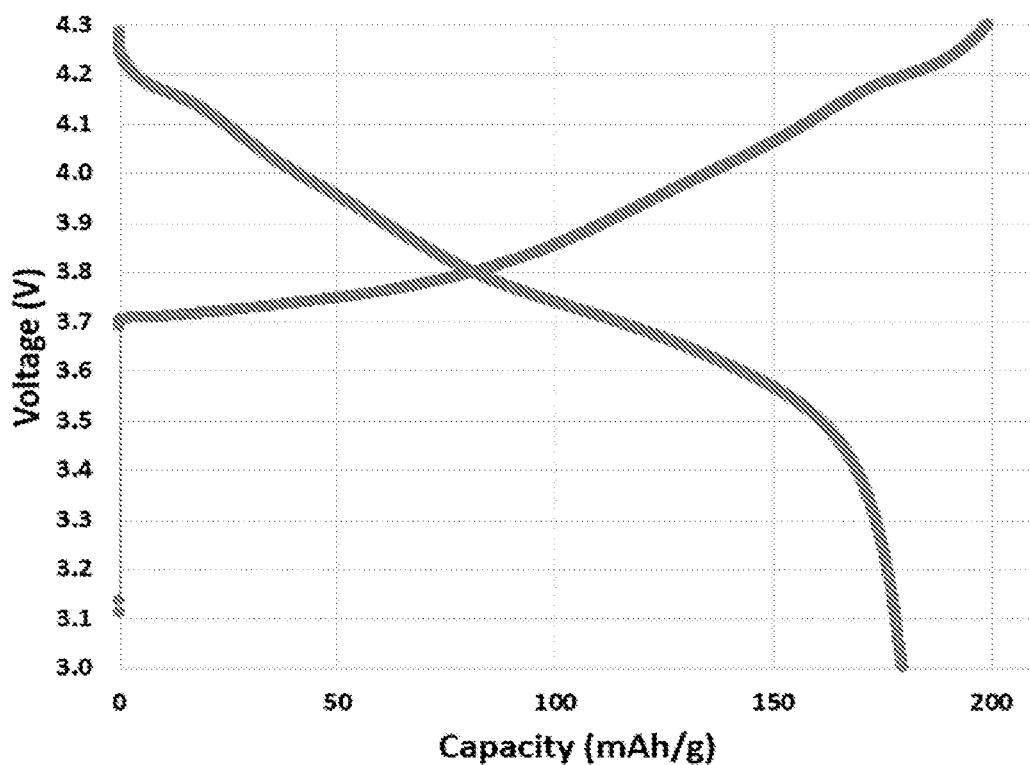
FIG. 11 shows a voltage profile in relation to a different solid state electrolyte embodiment disclosed herein for a 1$^{st}$ cycling at 0.1C.

FIG. 11 shows a voltage profile for $1^{st}$ cycling at 0.1C. This cell was charged and discharged at 0.1C for one cycle. The cell was prepared using NMC811 as the cathode, solid electrolyte membrane comprising of PCM/PAN/LiTFSI—$LiPF_6$/butyl cyanide and lithium metal of 200 μm thickness as the anode. The obtained charge capacity, discharge capacity and efficiency were 199 mAh/g, 180 mAh/g, 90.1% each.

Figure 12:
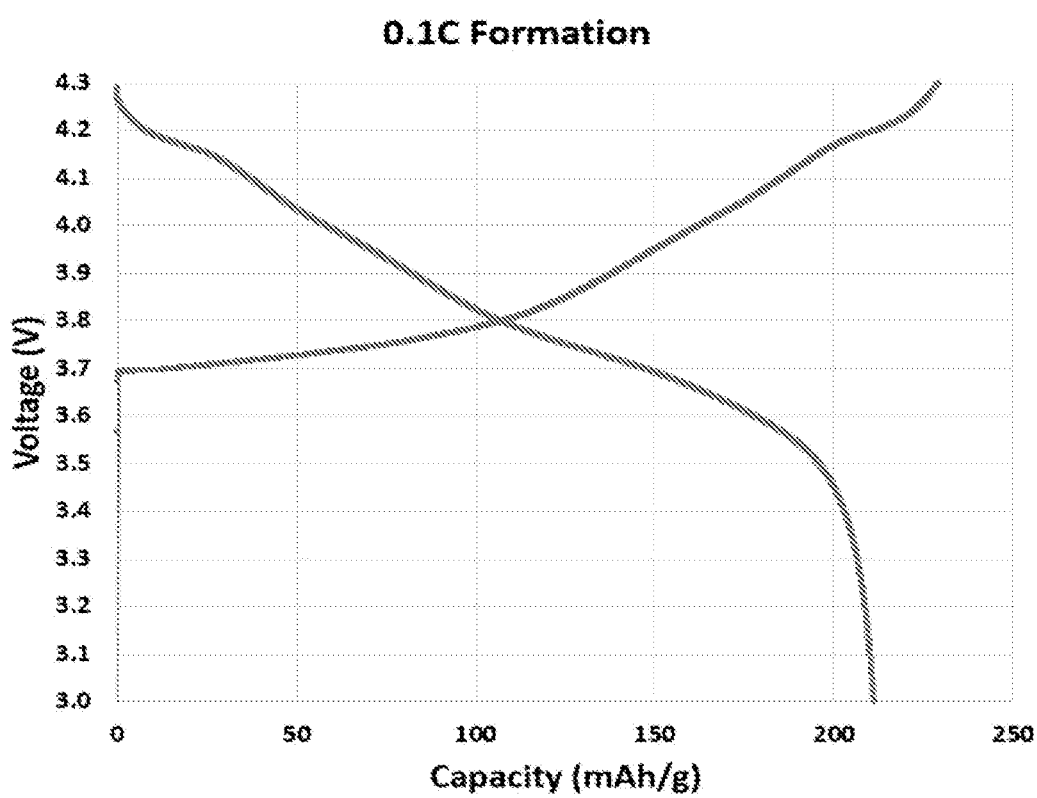
FIG. 12 shows a voltage profile in relation to a different solid state electrolyte embodiment disclosed herein for a $1^{st}$ cycling at 0.1C.

FIG. 12 shows a voltage profile for $1^{st}$ cycling at 0.1C. This cell was charged and discharged at 0.1C for one cycle. The cell was prepared using NMC811 as the cathode, solid electrolyte membrane comprising of PCM/PAN/LiTFSI—$LiPF_6$, and lithium metal of 200 μm thickness as the anode. The obtained charge capacity, discharge capacity and efficiency were 229 mAh/g, 210 mAh/g, 92.1% each.

Figure 13:
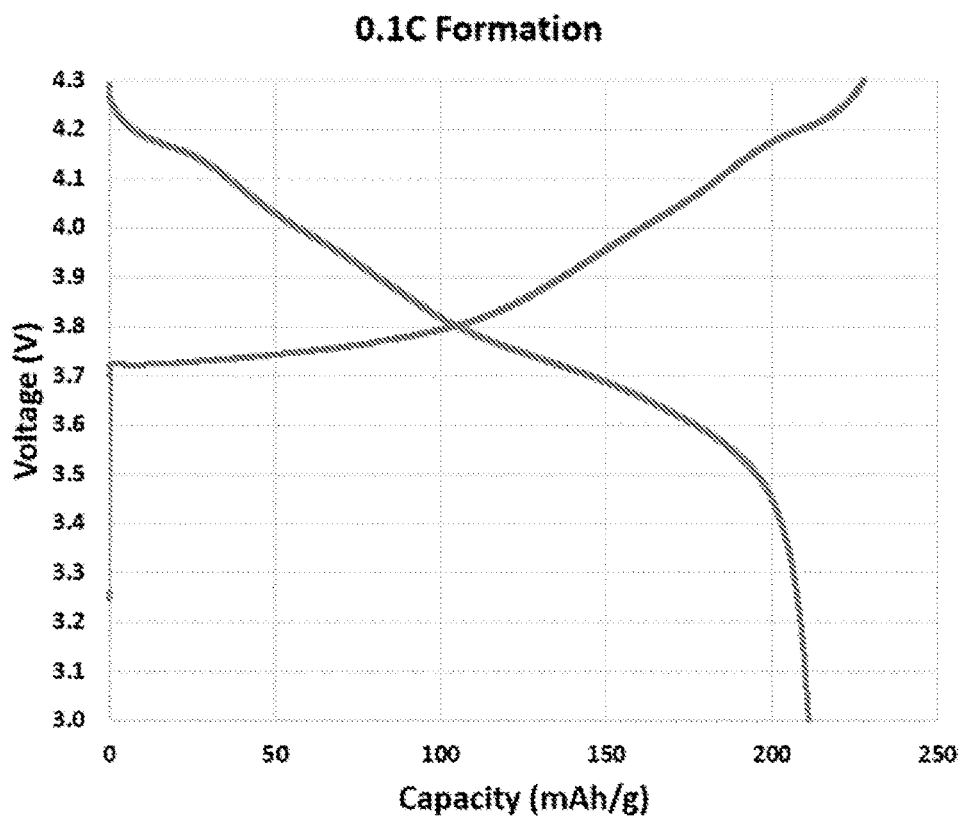
FIG. 13 shows a voltage profile in relation to a different solid state electrolyte embodiment disclosed herein for a $1^{st}$ cycling at 0.1C.

FIG. 13 shows a voltage profile for $1^{st}$ cycling at 0.1C. This cell was charged and discharged at 0.1C for one cycle. The cell was prepared using NMC811 as the cathode, solid electrolyte membrane comprising of PCM/PAN/LiTFSI—$LiPF_6$/1,4-dicyanobutane and lithium metal of 200 μm thickness as the anode. The obtained charge capacity, discharge capacity and efficiency were 228 mAh/g, 211 mAh/g, 92.7% each.

Figure 14:
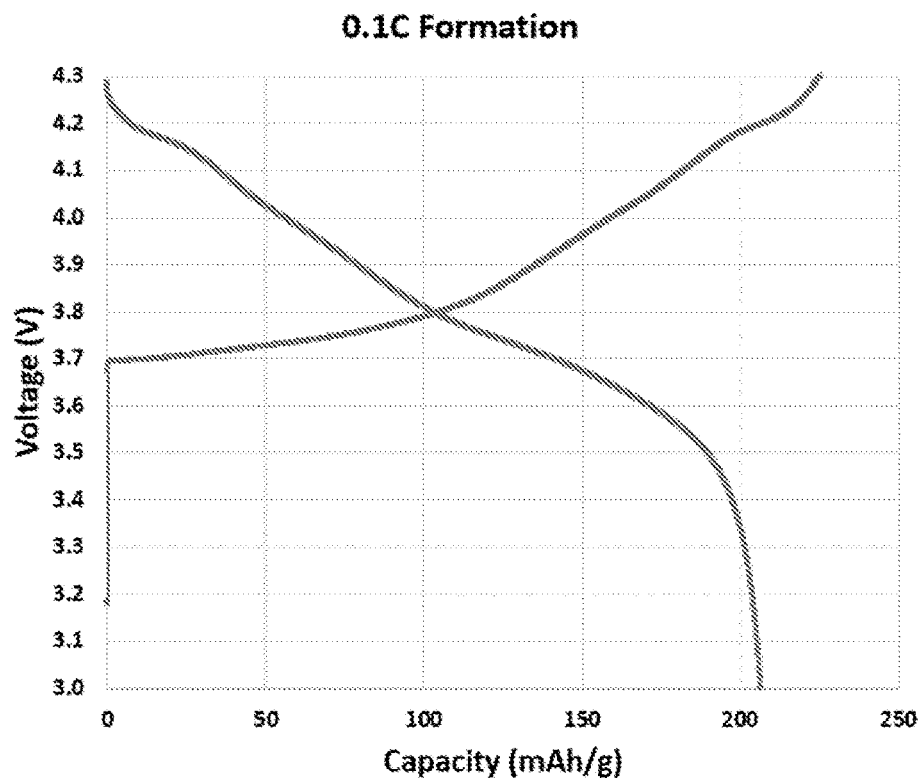
FIG. 14 shows a voltage profile in relation to a different solid state electrolyte embodiment disclosed herein for a $1^{st}$ cycling at 0.1C.

FIG. 14 shows a voltage profile for $1^{st}$ cycling at 0.1C. This cell was charged and discharged at 0.1C for one cycle. The cell was prepared using NMC811 as the cathode, solid electrolyte membrane comprising of PCM/PAN/LiTFSI—$LiAsF_6$/2-methylglutaronitrile and lithium metal of 200 μm thickness as the anode. The obtained charge capacity, discharge capacity and efficiency were 225 mAh/g, 207 mAh/g, 91.7% each.

Figure 15:
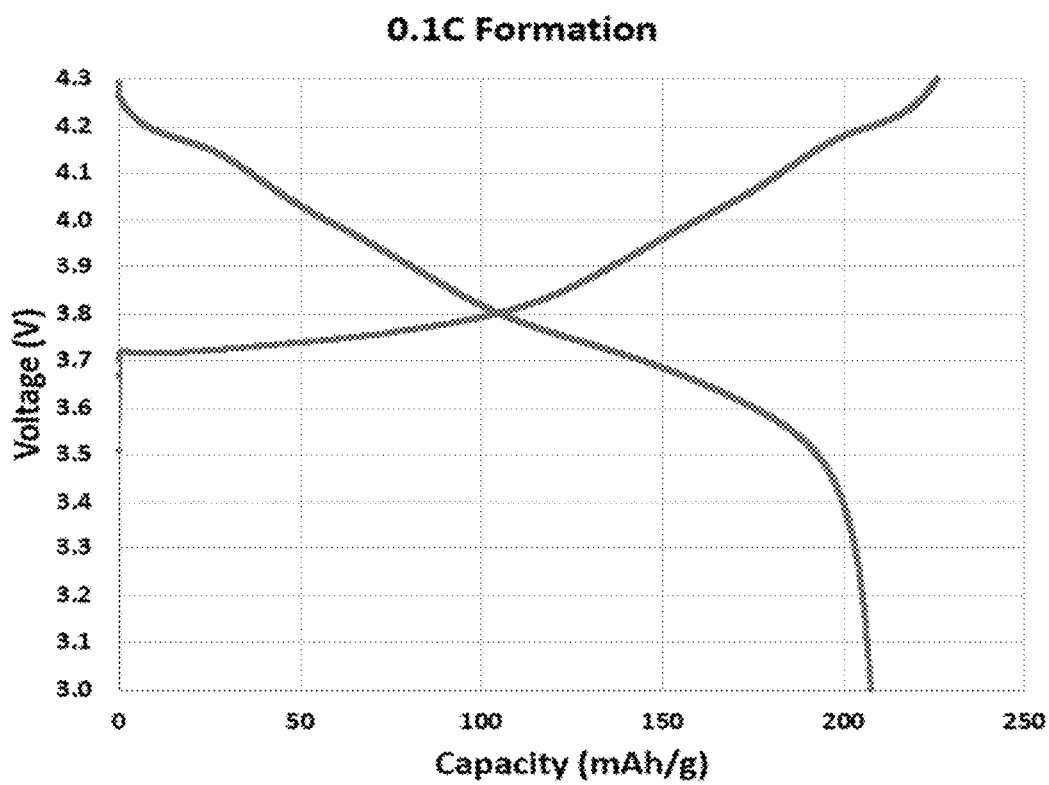
FIG. 15 shows a voltage profile in relation to a different solid state electrolyte embodiment disclosed herein for a $1^{st}$ cycling at 0.1C.

FIG. 15 shows a voltage profile for 1' cycling at 0.1C. This cell was charged and discharged at 0.1C for one cycle. The cell was prepared using NMC811 as the cathode, solid electrolyte membrane comprising of PCM/PAN/LiTFSI—LiAsF$_6$/1,4-dicyanobutane/butyl cyanide and lithium metal of 200 μm thickness as the anode. The obtained charge capacity, discharge capacity and efficiency were 226 mAh/g, 208 mAh/g, 91.8% each.

Example 4. [SEM Coating on PCM] PAN-PEO/LiPF$_6$ or LiAsF$_6$/1,3-Dicyanopropane or Butyl Cyanide The following materials were used for synthesis of the solid electrolyte solution: 1,3-dicyanopropane, polyacrylonitrile (PAN, MW 150,000, Sigma Aldrich), polyethylene oxide (PEO, Alfa Aesar) 1,3-dioxolan-2-one, spodumene (LiAl(SiO$_3$)) powder, lithium hexafluorophosphate (LiPF$_6$, 97%+, TCI America), and lithium hexafluoroarsenate (LiAsF$_6$, 99%, Alfa Aesar).

In a glove box, a solution was prepared by first melting 1,3-dioxolan-2-one at 70° C. and adding 10% of 1,3-dioxolan-2-one by mass of PAN. For complete dissolution, the mixture was stirred with a magnetic stirrer at 70° C. for 2 hours. When PAN was fully dissolved, PEO was added 30% of PAN by mass and stirring was continued for an hour. To this solution was added a lithium salt (LiPF$_6$ or LiAsF$_6$) in an amount matching that of PAN 10% of 1,3-dioxolan-2-one by mass and was dissolved over 1 hour of stirring under the same conditions. An addition of 1,3-dicyanopropane was made at an amount of 20% of total solution by mass and the solution was stirred for another 1 hour. The completed solution was cast onto a porous cellulose membrane by flattening the sheet on a glass plate and drawing down the material with a doctor blade. The membrane casting was dried under vacuum conditions at room for 1-2 hours.

Coin cells 2032 were assembled using solid electrolyte membrane prepared from described above with cathode electrode such as NCA, NMC811 and anode electrode such as lithium metal.

Each coin cell was cycled at 0.1C for $1^{st}$ cycle, 0.2C for $2^{nd}$ cycle and 0.3C from $3^{rd}$ cycle to the end of cycling test using voltage window of 3.0V to 4.3V.

Figure 16:
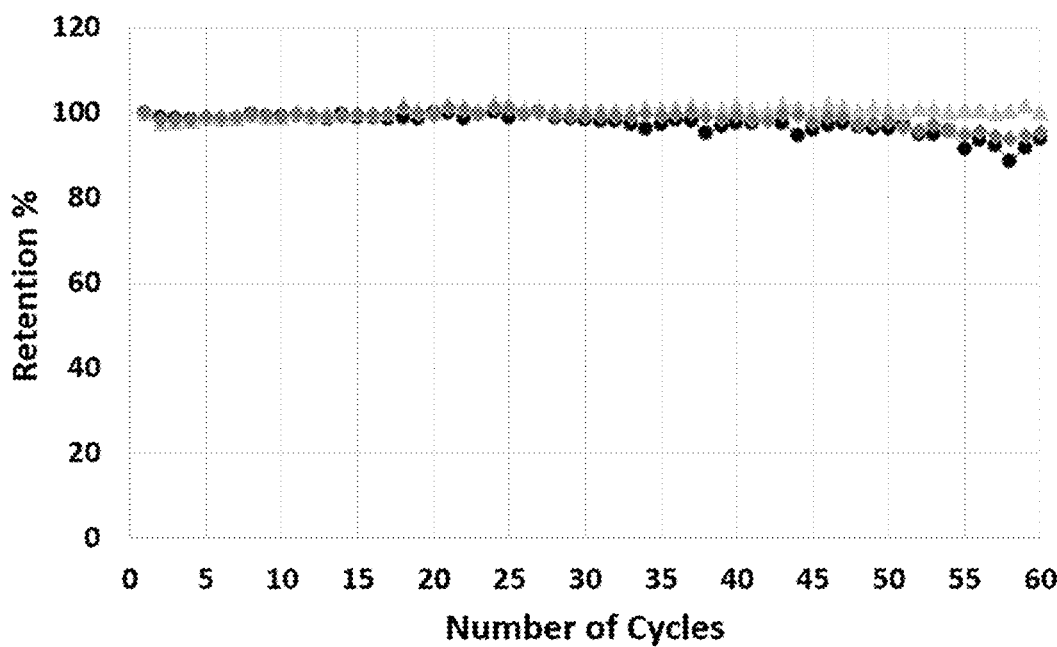
FIG. 16 shows a graphical representation of the cycling performance of another disclosed solid electrolyte embodiment with a capacity retention at 0.3C.

FIG. 16 shows cycling performance with a capacity retention (%) at 0.3C cycling.

Three cells were prepared using NMC811 as the cathode, solid electrolyte membrane comprising of PCM/PAN-PEO/LiPF$_6$/1,3-dicyanopropane/butyl cyanide, and lithium metal of 200 μm thickness as the anode at 0.3C.

Figure 17:
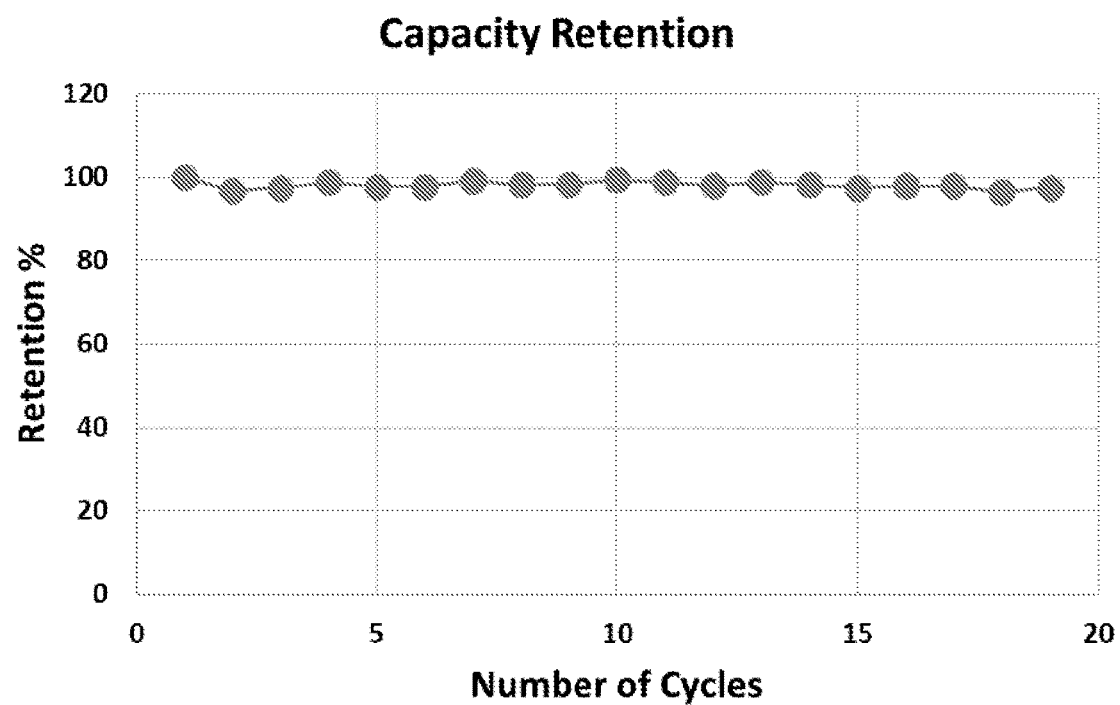
FIG. 17 shows a graphical representation of the cycling performance of another disclosed solid electrolyte embodiment with a capacity retention at 0.3C.

FIG. 17 shows cycling performance with a capacity retention (%). The cell was prepared using NMC811 as the cathode, solid electrolyte membrane comprising of PCM/PAN-PEO/LiAsF$_6$/1,3-dicyanopropane/butyl cyanide, and lithium metal of 200 μm thickness as the anode. The cells were cycled at 0.3C and demonstrated retention of 98% after 19 cycles.

Example 5. [Free Standing] PAN-Polyepoxides, LiPF$_6$, 1,3-Dicyanopropane or Butyl Cyanide The following materials were used for synthesis of the solid electrolyte solution: 1,3-dicyanopropane, polyacrylonitrile (PAN, MW 150,000, Sigma Aldrich), 1,3-dioxolan-2-one, polyepoxides (epoxy resin), spodumene (LiAl(SiO$_3$)$_2$) powder, and lithium hexafluorophosphate (LiPF$_6$, 97%+, TCI America).

In a glove box, a solution was prepared by first melting 1,3-dioxolan-2-one at 70° C. and adding 10% of 1,3-dioxolan-2-one by mass of PAN. For complete dissolution, the mixture was stirred with a magnetic stirrer at 70° C. for 2 hours. To this solution was added LiPF$_6$ in an amount matching that of PAN 10% of 1,3-dioxolan-2-one by mass and was dissolved over 1 hour of stirring under the same conditions. An addition of 1,3-dicyanopropane was made at an amount of about 20% of total solution by mass and the solution was stirred for another 1 hour. The filler spodumene (LiAl(SiO$_3$)$_2$) was added at an amount of 3% of total solution by mass and stirred for an additional 1 hour. After the solution was completed, polyepoxides (epoxy resin and hardener) were mixed and then added to the SEM solution at an amount of 5% of the total weight, then was quickly mixed by hand and prepared for casting.

The completed solution was cast onto the surface of a clean glass plate, and another was cast onto a sheet of aluminum foil adhered to a glass plate. The casting was completed by drawing down the material with a doctor blade. The membrane casting was dried under vacuum conditions at room temperature for 2 hours to create a dried solid electrolyte.

Coin cells 2032 were assembled using solid electrolyte membrane prepared from described above with cathode electrode such as NCA, NMC811 and anode electrode such as lithium metal.

Each coin cell was cycled at 0.1C for $1^{st}$ cycle, 0.2C for $2^{nd}$ cycle and 0.3C from $3^{rd}$ cycle to the end of cycling test using voltage window of 3.0V to 4.3V.

Figure 18:
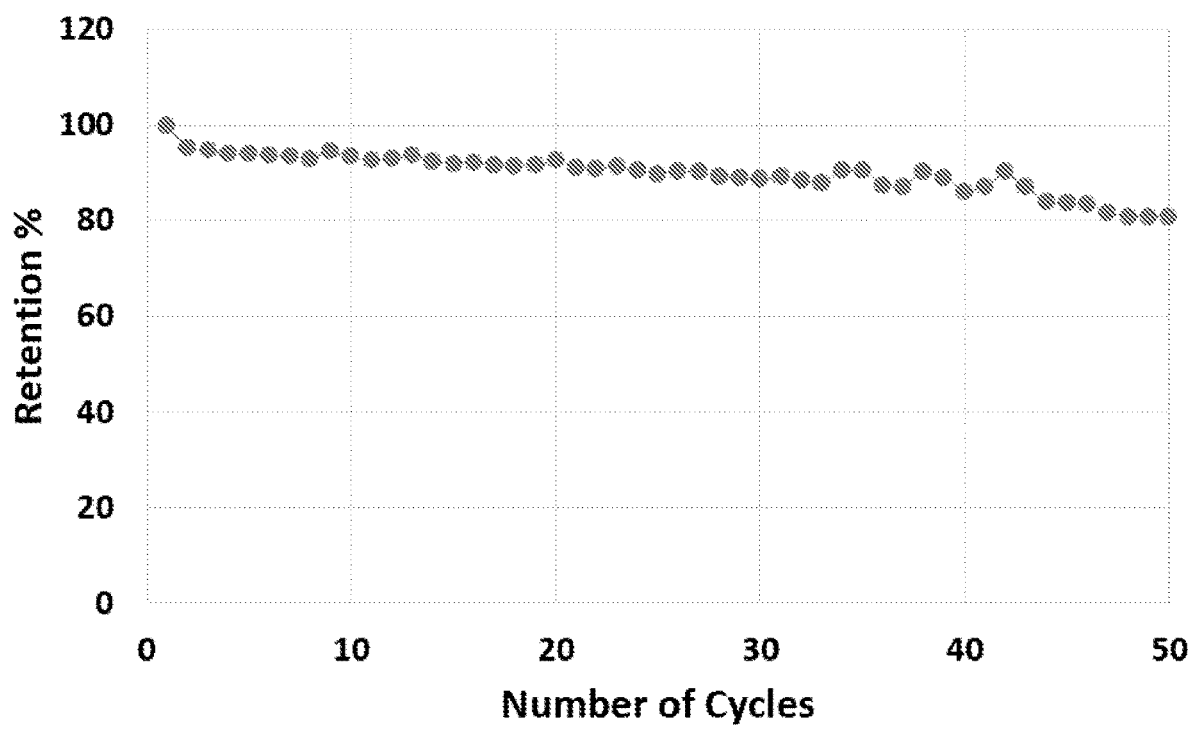
FIG. 18 shows a graphical representation of the cycling performance of another disclosed solid electrolyte embodiment with a capacity retention at 0.3C.

FIG. 18 shows cycling performance with a capacity retention (%) at 0.3C cycling. The cell was prepared using NMC811 as the cathode, solid electrolyte membrane comprising of Free-Standing/PAN/polyepoxides/LiPF$_6$/1,3-dicyanopropane/butyl cyanide, and lithium metal of 200 μm thickness as the anode. The cycle performance shows retention of 80% after 50 cycles.

Example 6. [Direct Casting onto Cathode Electrode or Anode Electrode (Silicon+Graphite) or Lithium Metal Anode] PAN/LiPF$_6$/1,3-Dicyanopropane and/or Butyl Cyanide An example containing one such, or any of the above solutions, where the method of casting is applied directly to a battery electrode instead of creating free-standing film. This direct casting method was applied to a cathode electrode (LiNi$_{0.8}$Co$_{0.1}$Mn$_{0.1}$O$_2$, NMC811), to an anode electrode (25 wt % SiOx-75% graphite blended), and to a lithium metal anode. The solid electrolyte solution was drawn down using a doctor blade to cast directly onto a sheet of the electrode. The membrane casting was dried under vacuum conditions at room temperature for 2 hours to create a dried solid electrolyte. Such a dried electrolyte membrane on cathode electrode can be used in unison to efficiently build battery cells.

Coin cells 2032 were assembled using solid electrolyte membrane as prepared and described above with cathode electrode such as NCA, NMC811 and anode electrode such as lithium metal.

Each coin cell was cycled at 0.1C for $1^{st}$ cycle, 0.2C for $2^{nd}$ cycle and 0.3C from $3^{rd}$ cycle to the end of cycling test using voltage window of 3.0V to 4.3V.

Figure 19:
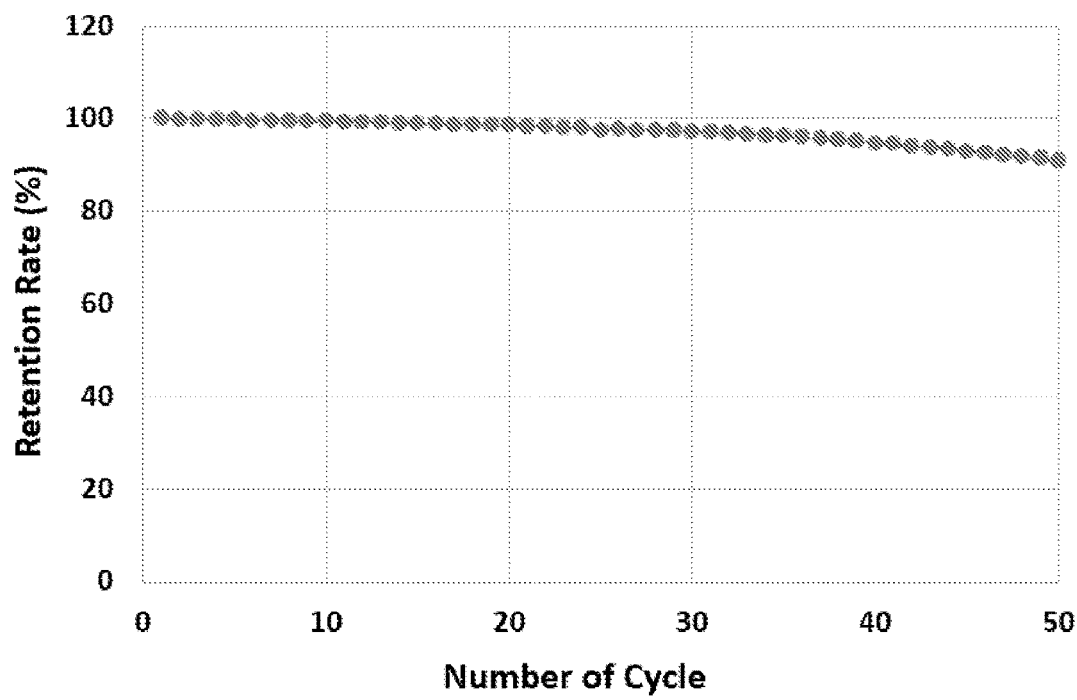
FIG. 19 shows a graphical representation of the cycling performance of another disclosed solid electrolyte embodiment with a capacity retention at 0.3C.

FIG. 19 shows cycling performance with a capacity retention (%) at 0.3C cycling. The cell was prepared by directly casting on the cathode (NMC811) with solid electrolyte membrane comprising of PAN/LiPF$_6$/1,3-dicyanopropane/butyl cyanide. The cycle performance shows retention of 91% after 50 cycles.

Figure 20:
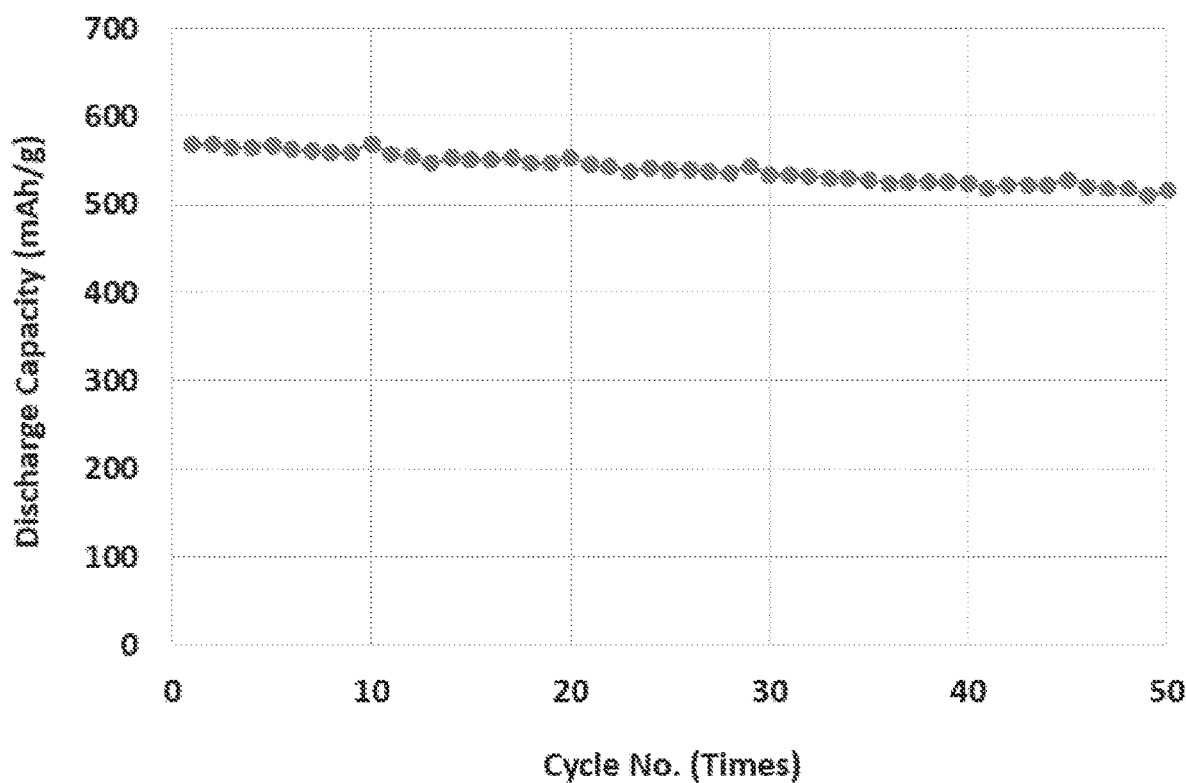
FIG. 20 shows a graphical representation of the discharge capacity in relation to cycling performance of another disclosed solid electrolyte embodiment with a capacity retention at 0.3C.

FIG. 20 shows cycling performance with a capacity retention (%) at 0.3C cycling. The cell was prepared by directly casting on anode electrode (SiOx+graphite blended) with solid electrolyte membrane comprising of PAN/LiPF$_6$/1,3-dicyanopropane/butyl cyanide. The cycle performance shows retention of 91% after 50 cycles.

Figure 21:
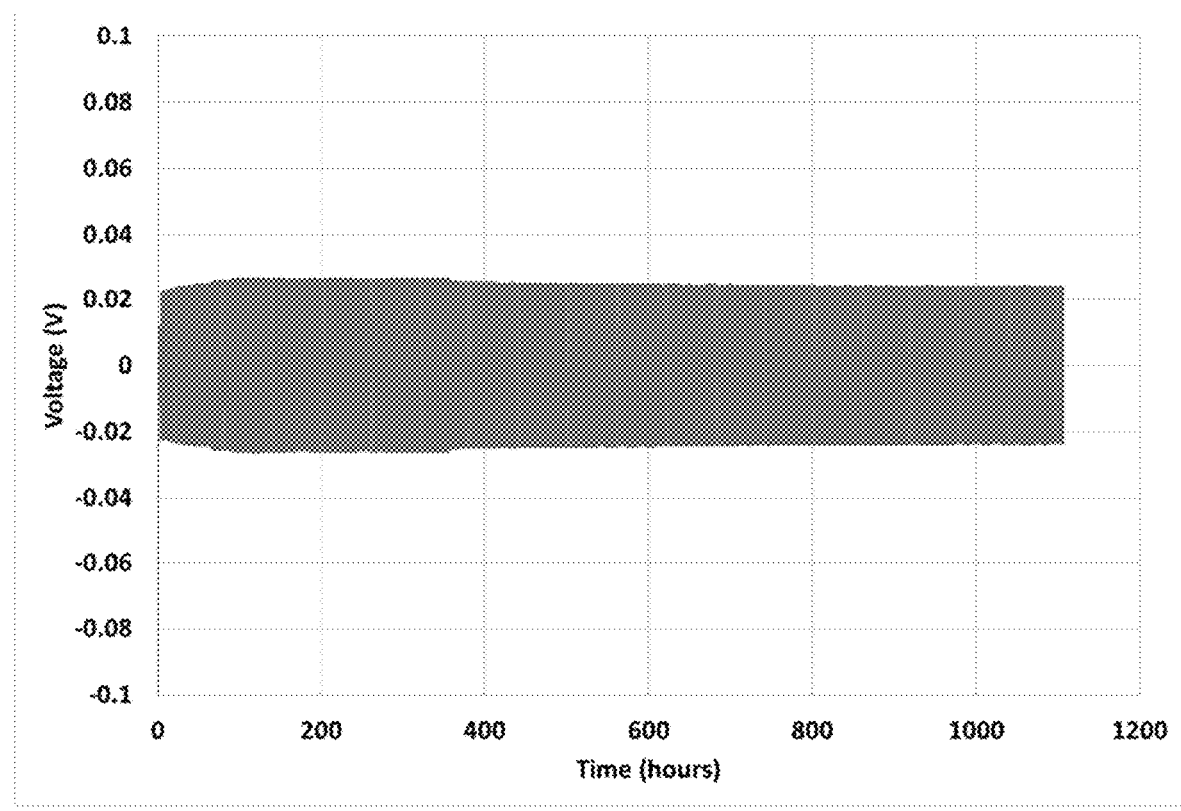
FIG. 21 shows a graphical representation of voltage measurements over 1,100 hours for a disclosed solid electrolyte membrane.

FIG. 21 shows cycling performance of lithium symmetric cell at 1 mA/cm$^2$. The cell was prepared by directly casting on lithium metal anode with solid electrolyte membrane comprising of PAN/LiPF$_6$/1,3-dicyanopropane/butyl cyanide. The cycle performance was herein measured by increasing the potential of cell until reaching 0.2V. The cell shows excellent lifetime measurements, with 1107 hours up to 0.2V.

Material Characterization

The ionic conductivity of a solid electrolyte membrane samples in a frequency ranges from 1 Hz to 1 MHz and a voltage amplitude of 10 mV, using two stainless steel electrodes at room temperature (25 degree Celsius) using a Biologic SP300 potentiostat.

The electrochemical stability of a solid electrolyte membrane was measured using linear sweep voltammetry method in voltage range from 0 V to 5 V at a 10 mV/s scan rate using Biologic SP300 potentiostat.

Tensile stress of solid electrolyte membrane was measured with tensile speed of 10 mm/min. Specimen size is 1 cm (width)×5 cm (length). PAN/PEO/LiAsF$_6$/1,4-dicyanobutane.

Figure 22:
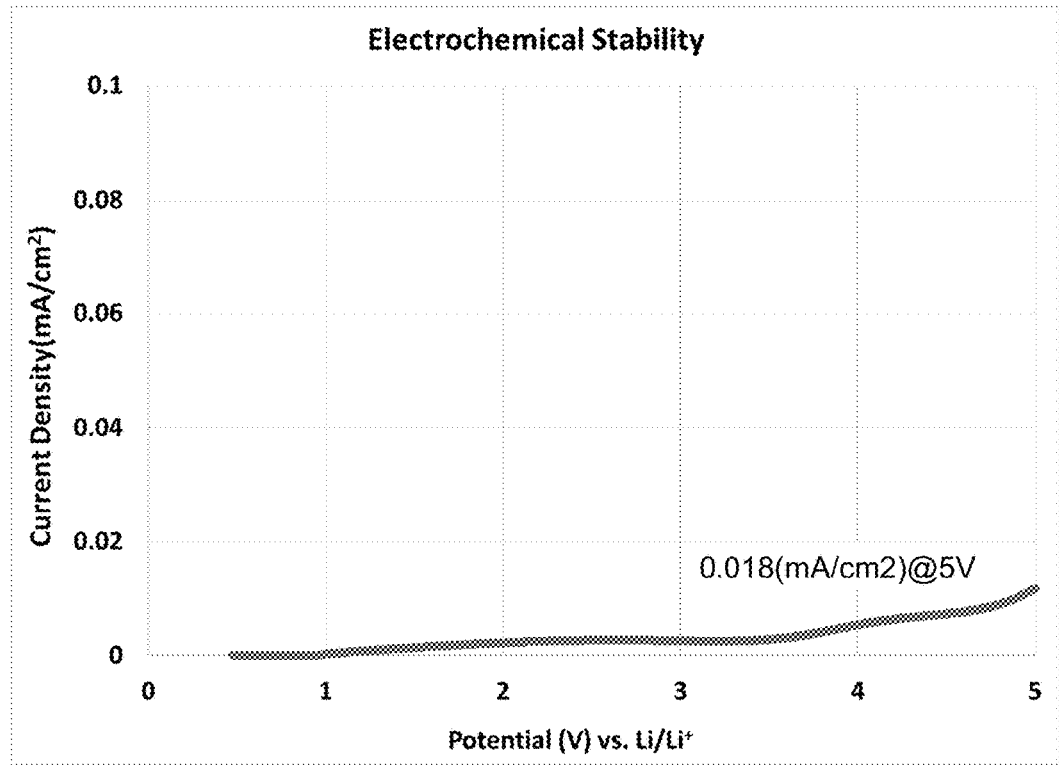
FIG. 22 shows a graphical representation of electrochemical stability using linear scanning voltammetry with a current density ($mA/cm^2$) vs potential (V) with a solid electrolyte membrane comprising of PAN/PEO/LiAsF$_6$/AN.

FIG. 22 shows electrochemical stability measurements using linear scanning voltammetry with the current density (mA/cm$^2$) vs potential (V) with solid electrolyte membrane comprising of PAN/PEO/LiAsF$_6$/1,4-dicyanobutane. It was measured from 0V to 5V and shows excellent electrochemical stability as current density of 0.018 mA/cm$^2$ at 5V.

FIG. 23 is a table of ionic conductivity values for various composition of solid electrolyte membrane. All the samples exhibited good IC values of $1 \times 10^{-4}$ S/cm or higher. In particular, sample #5 (PAN/LiTFSI(60)-LiPF$_6$(40)/1,3-dicyanopropane/butyl cyanide), sample #9 (PAN/LiTFSI(60)-LiAsF$_6$(40)/2-methylglutaronitrile (20%)), and sample #10 (PAN/LiTFSI(60)-LiAsF$_6$(40)/1,4-dicyanobutane (20%) containing two kinds of lithium salt show very excellent IC values more than $1 \times 10^{-3}$ S/cm.

FIG. 24 is a table presenting different tensile stress values of solid electrolyte membranes disclosed herein. A first, free-standing solid electrolyte membrane exhibits a tensile stress value of 0.5 MPa. In contrast, also presented is the tensile stress value for a substrate coated with a disclosed solid electrolyte membrane measured over 15 times greater than for the free-standing membrane structure. Due to such an improved mechanical property (tensile stress), the inclusion of such a substrate-coated solid electrolyte membrane as disclosed herein within a lithium ion battery manufacturing process imparts a significantly improved manufacturing processability. Such an improvement further indicates the excellent properties obtained in relation to the specific type(s) of solid electrolyte membranes described above.

With these examples, experimental test results, and descriptions, there is provided a significantly improved solid state polymer electrolyte membrane for utilization with and within battery devices. The combination of cyano molecules, lithium salts, plasticizer(s), a base polymer, and a nano- or micro-filler, has been found to accord excellent performance in every needed criterium.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

What is claimed is:

1. A solid electrolyte membrane comprising a reactive combination of constituents, said constituents comprising:
   a) a polyacrylonitrile polymer or a co-polymer selected from the group of polyacrylonitrile, poly(styrene-co-acrylonitrile), poly(acrylonitrile-co-butadiene-co-styrene), acrylonitrile butadiene rubber (NBR), and any combination thereof;
   b) at least one lithium salt having at least one of an inorganic anion and/or an organic anion;
   c) at least one cyano-based molecule comprising a mono-cyano molecule, a di-cyano molecule, tetracyanoethylene, 2,5-cyclohexadiene-1,4-diylidene and any cyano-derivatives thereof, or any combination thereof;
   d) at least one plasticizer present within at least one dielectric solvent selected from the group of propylene carbonate (PC), 1,3-dioxolan-2-one, and any combination thereof; and
   e) at least one nano- and/or micron-sized particle filler comprising lithophilic inorganic compounds;
   wherein the solid electrolyte membrane exhibits an ionic conductivity value between $2.0 \times 10^{-4}$ S/cm and $1.3 \times 10^{-3}$ S/cm at room temperature; and
   wherein the solid electrolyte membrane exhibits a tensile strength of at least 0.5 megapascals (MPa).

2. The solid electrolyte membrane of claim 1 wherein said membrane is a free-standing film.

3. The solid electrolyte membrane of claim 1 wherein:
   b) said lithium salt having an i) inorganic anion is selected from the group of lithium perchlorate (LiClO$_4$), lithium tetrafluoroborate (LiBF$_4$), lithium hexafluorophosphate (LiPF$_6$), lithium hexafluoro-arsenate (LiAsF$_6$), lithium hexafluoroantimonate (LiSbF$_6$), lithium hexafluorotantalate (LiTaF$_6$), and lithium hexafluoroniobate (LiNbF$_6$),
   ii) organic anion is selected from the group of lithium trifluoromethanesulfonate (LiCF$_3$SO$_3$), lithium perfluorobutylsulfonate (LiC$_4$F$_9$SO$_3$), lithium bis(trifluoromethanesulfonyl)imide (LiC$_2$F$_6$NO$_4$S$_2$), lithium bis (perfluoro-ethane-sulfonyl)imide (Li(CF$_3$CF$_2$SO$_2$)$_2$N), lithium tris(trifluoromethanesulfonyl) methide (C$_4$F$_9$LiO$_6$S$_3$), lithium pentafluoroethyltrifluoroborate (LiBF$_3$(C$_2$F$_5$)), lithium bis(oxalato)borate (LiB(C$_2$O$_4$)$_2$), lithium tetra(pentafluorophenyl)borate (C$_{24}$BF$_{20}$Li), lithium fluoroalkylphosphate (LiPF$_3$(CF$_3$CF$_2$)$_3$), lithium difluorophosphate, and lithium(difluorooxalato)borate;
   c) i) said mono-cyano group is selected from the group of butyl cyanide, 2-methylglutaronitrile, α-methylvalerodinitrile, and percyanoethylene, and
   ii) said di-cyano group is selected from the group of 1,4-dicyanobutane, 1,3-dicyanopropane, 1,2-dicyanoethane, 1,5-dicyanopetane, 1,6-dicyanohexane, trans-1,4-dicyano-2-butene, and trans-1,2-dicyanoethylene; and
   e) v) said lithophilic inorganic compounds include cations selected from the group consisting of Al, Ag, Au, Zn, Mg, Si, Sn, Ge, In, Ba, Bi, B, Ca, Cd, Ir, Pd, Pt, Rh, Sb, Se, Sr, Te, Zn, AgO, MgO, $MnO_2$, $Co_3O_4$, $SnO_2$, $SiO_2$, ZnO, CuO, and $Cu_2O$.

4. The solid electrolyte membrane of claim 1 wherein said membrane is a free-standing film or a substrate-assisted film present on at least one of cathodes or anodes.

5. The solid electrolyte membrane of claim 4 wherein said membrane exhibiting a thickness between 0.1 to 200 μm.

6. The solid electrolyte membrane of claim 4 wherein said membrane is a free-standing film or a substrate-assisted film present on at least one of cathodes or anodes.

7. The solid electrolyte membrane of claim 6 wherein said membrane exhibiting a thickness between 0.1 to 200 μm.

8. The solid electrolyte membrane of claim 4 wherein said membrane is a substrate-assisted film.

9. The solid electrolyte membrane of claim 8 wherein said substrate-assisted film is present on a substrate selected from the group consisting of an anode, a cathode, an anode-free substrate, a copper foil, a stainless-steel foil, and a separator.

10. The solid electrolyte membrane of claim 8 wherein the anode is selected from the group consisting of a-1) carbonaceous based materials including graphite(s), hard carbon, soft carbon, carbon nanotube, silicon-graphite, carbon composite, and lithium titanate ($Li_4Ti_5O_2$);
 a-2) lithium metal, lithium metal alloy, lithium metal composite, and any negative substrates in anode free cell configuration; and
 a-3) a substrate without active materials including copper foil, copper mesh, stainless steel, nickel-plated copper, and any combination of anode active material free substrates.

11. The solid electrolyte membrane of claim 9 wherein said substrate is the separator, which constitutes materials selected from the group consisting of polyolefin, polyester, ceramic-embedded polyester, polyvinylidene fluoride (PVDF), ceramic-filled PVDF, ceramic-coated PVDF, polytriphenylamine, porous cellulose, hemi-cellulose, lignin, and ceramic-filled porous fiber.

12. The solid electrolyte membrane of claim 9 wherein the cathode is selected from the group consisting of a) lithium metal oxides, b) tavorite phosphate- and sulfate-based compounds, c) fluorophosphates, d) $LiMSO_4F$, wherein M=Co, Ni, Mn, V, or Fe, e) polyanionic compounds, and/or f) sulfur (S8) for lithium sulfur batteries and porous carbon cathode for lithium air batteries.

13. The solid electrolyte membrane of claim 12 wherein said: a) lithium metal oxide is selected from the group consisting of $LiNiCoMnO_2$, $LiNiCoAlO_2$, $LiCoO_2$, $LiMn_2O_4$, $LiFePO_4$, $LiNi_{0.5}Mn_{1.5}O_4$, layer-spinel oxide, olivine $LiMPO_4$, and monolithic $Li_3M_2(PO_4)_3$, wherein M=Co, Ni, Mn, V, or Fe;
 b) tavorite phosphate- and sulfate-based compounds selected from the group consisting of $Li_yMXO_4Z$, wherein y=0, 1, 2; M=Co, Ni, Mn, V, Fe; X=P, S; and Z=F, O, OH;
 c) fluorophosphates selected from the group consisting of $Li_2MPO_4F$, wherein M is Co or Ni; and
 e) polyanionic compounds are selected from the group consisting of lithium pyrophosphates, lithium diphosphates, and lithium silicates.

14. A rechargeable lithium-ion battery comprising the solid electrolyte membrane of claim 1.

15. A rechargeable lithium-ion battery comprising the solid electrolyte membrane of claim 1, wherein the solid electrolyte membrane is a cathode-based solid electrolyte membrane that comprises reactants of a) the at least one mono and/or di-cyano molecule, and b) the at least one lithium salt with at least one organic anion functional group, wherein the thickness of said cathode-based solid electrolyte membrane ranges from about 0.1 μm to 200 μm.

16. A rechargeable lithium-ion battery comprising the solid electrolyte membrane of claim 1, wherein the solid electrolyte membrane is an anode-based solid electrolyte membrane that comprises reactants of a) the at least one mono and/or di-cyano molecule, and b) the at least one lithium salt with at least one organic anion functional group, wherein the thickness of said anode-based solid electrolyte membrane ranges from about 0.1 μm to 200 μm.

17. A rechargeable lithium-ion battery comprising the solid electrolyte membrane of claim 1, wherein the solid electrolyte membrane is an anode-free substrate-based solid electrolyte membrane that includes a copper foil and reactants of a) the at least one mono and/or di-cyano molecule, and b) the at least one lithium salt with at least one organic anion functional group, wherein the thickness of said anode-free substrate-based solid electrolyte membrane ranges from about 0.1 μm to 200 μm.

18. A rechargeable lithium-ion battery comprising the solid electrolyte membrane of claim 4.

19. A rechargeable lithium-ion battery comprising the solid electrolyte membrane of claim 6.

20. A rechargeable lithium-ion battery comprising the solid electrolyte membrane of claim 2.

* * * * *